US012126875B1

(12) United States Patent
Crow

(10) Patent No.: US 12,126,875 B1
(45) Date of Patent: Oct. 22, 2024

(54) SYSTEMS AND METHODS FOR GENERATING IMMERSIVE CONTENT FUSING DATA FROM MULTIPLE SOURCES

(71) Applicant: Sheryl Crow, Santa Monica, CA (US)

(72) Inventor: Sheryl Crow, Santa Monica, CA (US)

( * ) Notice: Subject to any disclaimer, the term of this patent is extended or adjusted under 35 U.S.C. 154(b) by 0 days.

(21) Appl. No.: 18/402,498

(22) Filed: Jan. 2, 2024

Related U.S. Application Data

(60) Provisional application No. 63/601,379, filed on Nov. 21, 2023.

(51) Int. Cl.
| | | |
|---|---|---|
| *H04N 21/81* | (2011.01) | |
| *G06T 17/00* | (2006.01) | |
| *G06T 19/20* | (2011.01) | |
| *H04N 21/2187* | (2011.01) | |
| *H04N 21/231* | (2011.01) | |
| *H04N 21/239* | (2011.01) | |

(52) U.S. Cl.
CPC ......... *H04N 21/8146* (2013.01); *G06T 17/00* (2013.01); *G06T 19/20* (2013.01); *H04N 21/2187* (2013.01); *H04N 21/231* (2013.01); *H04N 21/2393* (2013.01); *G06T 2219/2004* (2013.01); *G06T 2219/2024* (2013.01)

(58) Field of Classification Search
None
See application file for complete search history.

(56) References Cited

U.S. PATENT DOCUMENTS

| | | | | |
|---|---|---|---|---|
| 2010/0030578 | A1* | 2/2010 | Siddique | H04W 4/00 705/26.1 |
| 2021/0089779 | A1* | 3/2021 | Chan | H04N 21/472 |
| 2021/0383115 | A1* | 12/2021 | Alon | G06Q 30/0276 |

FOREIGN PATENT DOCUMENTS

CN 112381955 A * 12/2021

* cited by examiner

*Primary Examiner* — Yingchun He
(74) *Attorney, Agent, or Firm* — GREENBERG TRAURIG, LLP

(57) ABSTRACT

Systems and method of the present disclosure enable immersive experiences associated with live and/or recorded events. The immersive experience is created by generating a 3D model of the user. A presence of the user is detected at the live event via the software application. Upon detecting the presence, the software application controls the user's device to disable a function of the user device during the live event, and determine fusion points in the imagery to identify a particular position at which to integrate the 3D model into the imagery. The 3D model is inserted into the imagery at the particular position so as to integrate the 3D model into the imagery. The live event is recorded for the user to access, using the software application, after the live event, in which the 3D model is inserted into one or more of the same or different fusions points.

28 Claims, 8 Drawing Sheets

SYSTEMS AND METHODS FOR GENERATING IMMERSIVE CONTENT FUSING DATA FROM MULTIPLE SOURCES

FIELD OF TECHNOLOGY

The present disclosure generally relates to computer-based systems and methods for generating immersive content fusing data from multiple sources, including content configured for adaptive 3D playback.

SUMMARY OF THE DISCLOSURE

In some aspects, the techniques described herein relate to a method including: receiving, by at least one processor from a user device via a software application installed on the user device, event data associated with at least one live event associated with at least one performer; generating, by the at least one processor, an indicia associated with the event data to represent authorization of the user to access the at least one live event; receiving, by the at least one processor, at least one image of the user; inputting, by the at least one processor, the at least one image into a three-dimensional modelling engine configured to generate at least one three-dimensional model of the user based at least in part on the at least one image; linking, by the at least one processor, the at least one three-dimensional model to the indicia; accessing, by the at least one processor, visual content associated with the at least one live event, the visual content being configured to accompany at least one performance associated with the at least one live event; wherein the visual content includes imagery, the imagery including a plurality of fusion points representing a plurality of candidate positions from which at least one particular position is configured to be selected for integrating the at least one three-dimensional model into the imagery; detecting, by the at least one processor via the software application, a presence of the user at the at least one live event; instructing, by the at least one processor, upon detecting the presence, the software application to control the user device to disable access by the user to at least one function of the user device during the at least one live event; determining, by the at least one processor, upon detecting the presence, at least one fusion point of the plurality of fusions in the imagery to identify the at least one particular position of the plurality of candidate positions at which to integrate the at least one three-dimensional model into the imagery; inserting, during the live event, by the at least one processor, the at least one three-dimensional model into the imagery at the at least one particular position of the at least one fusion point; determining, during the live event, by the at least one processor, at least one attribute of the at least one particular position based at least in part on fusion point data associated with the at least one fusion point; modifying, during the live event, by the at least one processor, the at least one three-dimensional model based at least in part on the at least one attribute so as to integrate the at least one three-dimensional model into the imagery; storing, by the at least one processor, at least one recording of the at least one live event in association with the indicia so as to enable the at least one user to access, using the software application, the at least one recording after the at least one live event; and wherein the software application is configured to enable the at least one user to instruct to fuse the at least one three-dimensional model of the at least one user into one or more recording imagery positions of the imagery, the one or more of recording imagery positions being one or more same or different positions relative to the at least one particular position; and wherein the software application is configured to enable the at least one user to view, via at least one display device, the at least one recording of the at least one live event having the at least one three-dimensional model integrated into the one or more recording imagery positions.

In some aspects, the techniques described herein relate to a method, wherein modifying the at least one three-dimensional model includes at least one of: positioning the at least one three-dimensional model within the imagery, orienting the at least one three-dimensional model within the imagery, altering a style or tone or both of the at least one three-dimensional model to match the imagery, or applying at least one dynamic effect to the at least one three-dimensional model to match the imagery.

In some aspects, the techniques described herein relate to a method, wherein the at least one recording is provided on a portable storage device provided to the at least one user.

In some aspects, the techniques described herein relate to a method, further including: storing, by the at least one processor, the at least one recording in at least one content delivery system; receiving, by the at least one processor, at least one access request to access the at least one recording in the at least one content delivery system, the at least one access request including the indicia; and communicating, by the at least one processor, the at least one recording to the user device via the software application based at least in part on the indicia.

In some aspects, the techniques described herein relate to a method, wherein the at least one recording includes an augmented reality recording of the at least one live event, the at least one augmented reality recording being configured to be played back to the at least one user via the at least one display device; and wherein the at least one display device includes at least one headset configured for at least one of: augmented reality content, or virtual reality content.

In some aspects, the techniques described herein relate to a method, further including: receiving, by the at least one processor via the software application, at least one selection by the at least one user to the at least one user to purchase at least one portion of the at least one recording; wherein the at least one portion includes at least one of: at least one clip of the at least one recording, or at least one image of the at least one recording receiving, by the at least one processor, at least one subsequent image of the at least one user, wherein the at least one subsequent image include at least one same or different image relative to the at least one image; inputting, by the at least one processor, the at least one subsequent image into a three-dimensional modelling engine configured to generate at least one subsequent three-dimensional model of the user based at least in part on the at least one subsequent image; inserting, into the at least one portion of the at least one recording, by the at least one processor, the at least one subsequent three-dimensional model at the one or more recording imagery positions; determining, into the at least one portion of the at least one recording, by the at least one processor, at least one recording attribute of the one or more recording imagery positions based at least in part on fusion point data associated with the one or more recording imagery positions; and modifying, in the at least one portion of the at least one recording, by the at least one processor, the at least one subsequent three-dimensional model based at least in part on the at least one recording attribute so as to integrate the at least one subsequent three-dimensional model into the at least one portion.

In some aspects, the techniques described herein relate to a method, wherein the software application is further configured to enable the at least one user to share the at least one portion of the at least one recording on at least one social media platform.

In some aspects, the techniques described herein relate to a method, further including: instructing, by the at least one processor, a three-dimensional scanning device to capture the at least one image of the at least one user in response to the at least one user confirming the indicia; receiving, by the at least one processor from the three-dimensional scanning device, the at least one image of the at least one user; wherein the at least one image includes scan data output by the three-dimensional scanning device, the scan data providing depth data so as to enable representing the at least one image in three dimensions.

In some aspects, the techniques described herein relate to a method, further including: receiving, by the at least one processor from the user device via the software application, the at least one image of the user;

In some aspects, the techniques described herein relate to a method, wherein the software application includes a camera function configured to capture the at least one image of the user via an image sensor associated with the user device.

In some aspects, the techniques described herein relate to a method, wherein the software application is configured to: access an image library and enable the user to select the at least one image to upload to the at least one processor.

In some aspects, the techniques described herein relate to a method, wherein the image library is configured to enable the user to select the at least one image for fusion into a particular portion of the visual content.

In some aspects, the techniques described herein relate to a method, further including: receiving, by at least one processor, via a capture system in response to the indicia, the at least one image of the user; wherein the capture system includes at least one device configured to perform at least one scan to produce the at least one image including scan data configured to enable constructing a three-dimensional model.

In some aspects, the techniques described herein relate to a method, wherein the at least one function includes at least one of: a camera application of the user device, or at least one social media application.

In some aspects, the techniques described herein relate to a system including: at least one processor in communication with at least one non-transitory computer readable medium having software instructions stored thereon, wherein the at least one processor, upon execution of the software instructions, is configured to perform steps to: receiving, by at least one processor from a user device via a software application installed on the user device, event data associated with at least one live event associated with at least one performer; generate an indicia associated with the event data to represent authorization of the user to access the at least one live event; receive at least one image of the user; input the at least one image into a three-dimensional modelling engine configured to generate at least one three-dimensional model of the user based at least in part on the at least one image; link the at least one three-dimensional model to the indicia; access visual content associated with the at least one live event, the visual content being configured to accompany at least one performance associated with the at least one live event; wherein the visual content includes imagery, the imagery including a plurality of fusion points representing a plurality of candidate positions from which at least one particular position is configured to be selected for integrating the at least one three-dimensional model into the imagery; detecting, by the at least one processor via the software application, a presence of the user at the at least one live event; instruct upon detecting the presence, the software application to control the user device to disable access by the user to at least one function of the user device during the at least one live event; determine upon detecting the presence, at least one fusion point of the plurality of fusions in the imagery to identify the at least one particular position of the plurality of candidate positions at which to integrate the at least one three-dimensional model into the imagery; inserting, during the live event, by the at least one processor, the at least one three-dimensional model into the imagery at the at least one particular position of the at least one fusion point; determining, during the live event, by the at least one processor, at least one attribute of the at least one particular position based at least in part on fusion point data associated with the at least one fusion point; modifying, during the live event, by the at least one processor, the at least one three-dimensional model based at least in part on the at least one attribute so as to integrate the at least one three-dimensional model into the imagery; store at least one recording of the at least one live event in association with the indicia so as to enable the at least one user to access, using the software application, the at least one recording after the at least one live event; and wherein the software application is configured to enable the at least one user to instruct to fuse the at least one three-dimensional model of the at least one user into one or more recording imagery positions of the imagery, the one or more of recording imagery positions being one or more same or different positions relative to the at least one particular position; and wherein the software application is configured to enable the at least one user to view, via at least one display device, the at least one recording of the at least one live event having the at least one three-dimensional model integrated into the one or more recording imagery positions.

In some aspects, the techniques described herein relate to a system, wherein modifying the at least one three-dimensional model includes at least one of: positioning the at least one three-dimensional model within the imagery, orienting the at least one three-dimensional model within the imagery, altering a style or tone or both of the at least one three-dimensional model to match the imagery, or applying at least one dynamic effect to the at least one three-dimensional model to match the imagery.

In some aspects, the techniques described herein relate to a system, wherein the at least one recording is provided on a portable storage device provided to the at least one user.

In some aspects, the techniques described herein relate to a system, wherein the at least one processor, upon execution of the software instructions, is further configured perform steps to: store the at least one recording in at least one content delivery system; receive at least one access request to access the at least one recording in the at least one content delivery system, the at least one access request including the indicia; and communicate the at least one recording to the user device via the software application based at least in part on the indicia.

In some aspects, the techniques described herein relate to a system, wherein the at least one recording includes an augmented reality recording of the at least one live event, the at least one augmented reality recording being configured to be played back to the at least one user via the at least one display device; and wherein the at least one display device includes at least one headset configured for at least one of: augmented reality content, or virtual reality content.

In some aspects, the techniques described herein relate to a system, wherein the at least one processor, upon execution of the software instructions, is further configured perform steps to: receiving, by the at least one processor via the software application, at least one selection by the at least one user to the at least one user to purchase at least one portion of the at least one recording; wherein the at least one portion includes at least one of: at least one clip of the at least one recording, or at least one image of the at least one recording receive at least one subsequent image of the at least one user, wherein the at least one subsequent image include at least one same or different image relative to the at least one image; input the at least one subsequent image into a three-dimensional modelling engine configured to generate at least one subsequent three-dimensional model of the user based at least in part on the at least one subsequent image; insert, into the at least one portion of the at least one recording, the at least one subsequent three-dimensional model at the one or more recording imagery positions; determine, into the at least one portion of the at least one recording, at least one recording attribute of the one or more recording imagery positions based at least in part on fusion point data associated with the one or more recording imagery positions; and modify, in the at least one portion of the at least one recording, the at least one subsequent three-dimensional model based at least in part on the at least one recording attribute so as to integrate the at least one subsequent three-dimensional model into the at least one portion.

In some aspects, the techniques described herein relate to a system, wherein the software application is further configured to enable the at least one user to share the at least one portion of the at least one recording on at least one social media platform.

In some aspects, the techniques described herein relate to a system, wherein the at least one processor, upon execution of the software instructions, is further configured perform steps to: instruct a three-dimensional scanning device to capture the at least one image of the at least one user in response to the at least one user confirming the indicia; receiving, by the at least one processor from the three-dimensional scanning device, the at least one image of the at least one user; wherein the at least one image includes scan data output by the three-dimensional scanning device, the scan data providing depth data so as to enable representing the at least one image in three dimensions.

In some aspects, the techniques described herein relate to a system, wherein the at least one processor, upon execution of the software instructions, is further configured perform steps to: receiving, by the at least one processor from the user device via the software application, the at least one image of the user;

In some aspects, the techniques described herein relate to a system, wherein the software application includes a camera function configured to capture the at least one image of the user via an image sensor associated with the user device.

In some aspects, the techniques described herein relate to a system, wherein the software application is configured to: access an image library and enable the user to select the at least one image to upload to the at least one processor.

In some aspects, the techniques described herein relate to a system, wherein the image library is configured to enable the user to select the at least one image for fusion into a particular portion of the visual content.

In some aspects, the techniques described herein relate to a system, wherein the at least one processor, upon execution of the software instructions, is further configured perform steps to: receiving, by at least one processor, via a capture system in response to the indicia, the at least one image of the user; wherein the capture system includes at least one device configured to perform at least one scan to produce the at least one image including scan data configured to enable constructing a three-dimensional model.

In some aspects, the techniques described herein relate to a system, wherein the at least one function includes at least one of: a camera application of the user device, or at least one social media application.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1A:
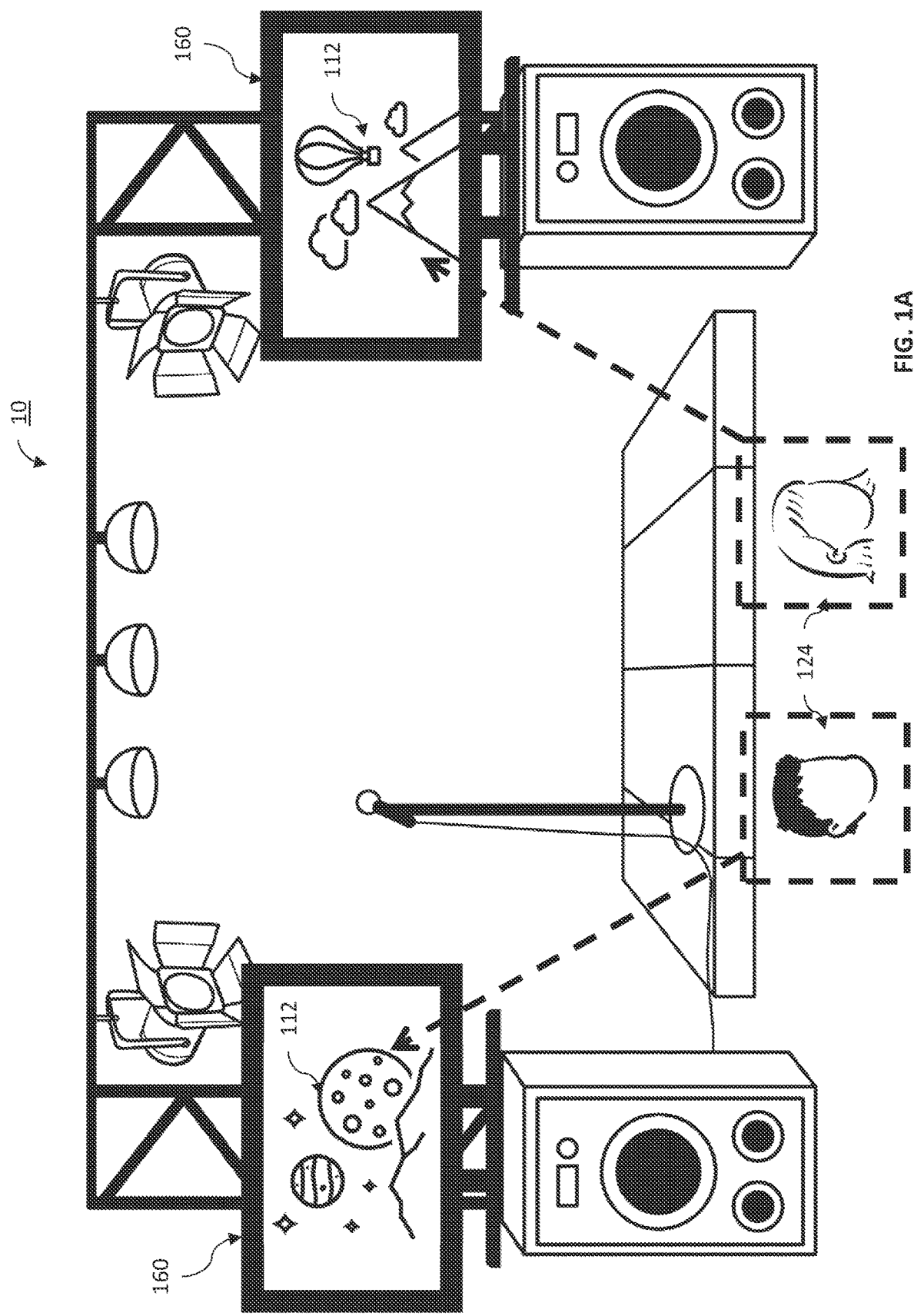
FIG. 1A and FIG. 1B depict a content fusion engine as fusing a 3-dimensional (3D) model of one or more users into A/V content of a live event in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 6 illustrate systems and methods of inserting and fusing a user representation into content of a live event such as performance. The following embodiments provide technical solutions and technical improvements that overcome technical problems, drawbacks and/or deficiencies in the technical fields involving choreographed and/or scripted content rendering and user experiences associated with interacting with the content. As explained in more detail, below, technical solutions and technical improvements herein include aspects of improved user experience via immersive integration of user representations into content associated with a live or recorded event. Live events may be accompanied by content, including 2D and/or 3D audio-visual content. The content may be choreographed to synchronize with the live event, and include one or more insertion points having locations at which a representation of a user may be integrated to immerse the user into the experience of the live event by having their likeness seamlessly fused with the content to become a part of the live event. Thus, embodiments of the present disclosure provide improved user experiences in attending live events and viewing recorded events by seamlessly integrating the representation of the user into the content of the event using 3D modelling, fusion point selection, dynamic orientation, positioning, filtering and effects.

Based on such technical features, further technical benefits become available to users and operators of these systems and methods. Moreover, various practical applications of the disclosed technology are also described, which provide further practical benefits to users and operators that are also new and useful improvements in the art.

Live Event Entry and Ticketing/Software Application

Figure 1B:
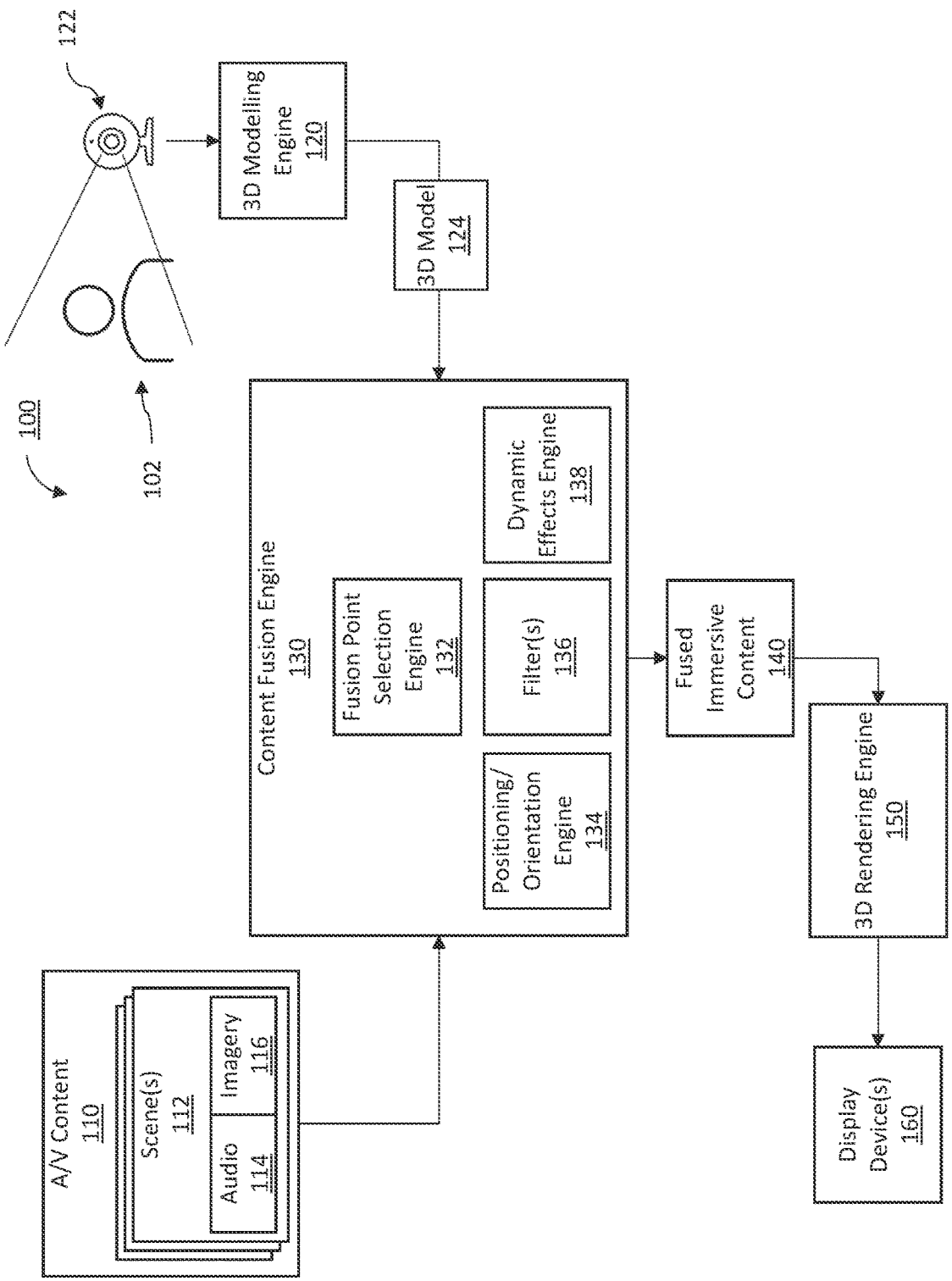

Referring to FIGS. 1A and 1B, a content fusion engine 130 is illustrated as fusing a 3-dimensional (3D) model 124 of one or more users 102 into A/V content 110 of a live event 10 in accordance with one or more embodiments of the present disclosure.

In some embodiments, the content fusion engine 130 may insert representations of users 102 into the A/V content 110 to create fused immersive content 140 whereby the users 102 may see themselves in scene(s) 112 depicted in the A/V content 110. As is described in more detail below, the content fusion engine 130 may use pre-recorded A/V content 110 and/or streaming A/V content 110 to insert the user's 102 representation after the fact into the pre-recorded A/V content 110 or in real-time into the streaming A/V content 110. Indeed, the A/V content 110 may be associated with a performance, such as a concert, theater production, stand-up comedy show, lecture, circus, ballet, among others or any combination thereof. Thus, the user's 102 representation may be inserted into A/V content 110 of the performance during the performance in real-time and/or after the fact into a recording of the performance.

In some embodiments, the users 102 may gain entry to the live event 10, e.g., by buying a ticket, or otherwise acquiring a right to enter the live event 10. Upon doing so, the users 102 may be provided with a ticket for entry that may include indicia representing a uniquely identifiable code such as a ticket number, user number, username, randomly generated code, machine readable indicia (e.g., barcode, QR code, etc.), among other indicia or any combination thereof. In some embodiments, the ticket may be physical and/or electronic (e.g., on a smartphone application, webpage, Apple Wallet™, Google Pay™, Samsung Pay™, etc.). In some embodiments, the indicia of the ticket may identify the user such that the indicia may be stored in a database and linked to, e.g., a 3D model 124 associated with the user 102 as detailed below. Thus, each user 102 may be linked to their 3D model 124. In some embodiments, the ticket may be for a live or recorded virtual event, or a live or recorded physical event, or any combination thereof.

In some embodiments, at entry the user 102 may be provided the option to give user permissions to show the user 102 in imagery during and/or after the live event 10. In some embodiments, the permissions may be used to configure the content fusion engine 130 and/or rendering engine 150 to affect when and/or if the user 102 is to be represented in the content 110 of the live event 10. In some embodiments, the user 102 selecting to not give permission to store and/or use the user 102 in content after the live event 10 may cause the content fusion engine 130 to remove the 3D model 124 of the user 102 from any recordings of the live event 10 and from any databases storing the 3D models 124. Where the user 102 selects to not give permission to use the user 102 during the live event 10, the content fusion engine 130 may be configured to remove the user 102 and/or associated 3D model 124 from the set of users 102 eligible to be inserted into the content 110 of the live event 10. In some embodiments, even where the user 102 does not provide permission to use the user 102 before, during or after the live event 10, the user 102 may be provided, as detailed further below, a copy of the user's 102 3D model 124 and/or a recording and/or access to a recording of the live event 10 for fusion of the 3D model 124 into the recording for personal viewing and experience.

In some embodiments, the ticket may take the form of or may be associated with a software application (e.g., a smartphone application) for the live event 10. In some embodiments, the indicia may provide authentication to install and/or access the application. In some embodiments, the application may be granted device permissions, e.g., to monitor geo-location, control user access to a camera of the device, access an NFC and/or Bluetooth radio or other wireless communication radios, among other device permissions or any combination thereof. In some embodiments, the user may be required to present the software application, show a copy of the indicia (e.g., via QR code or barcode) using the software application, authenticate using the NFC and/or Bluetooth radio, among other mechanisms to authenticate the user's 102 access to the live event 10, thus forming a digital or virtual ticket to the live event 10. In some embodiments, upon being granted entry to the live event 10, the software application, using an instruction from an authentication server and/or geo-location to detect the presence of the user 102 at the live event 10. As a result, the software application may disable user access to the camera of the device and/or to social media and/or device usage in general, thus preventing the user 102 from recording the live event 10 or the device otherwise distracting the user 102 from the live event 10.

In some embodiments, the software application may be installed in response to the user 102 scanning a QR code associated with the ticket and/or at the entrance to the live event 10. In some embodiments, installation of the software application may be a prerequisite to entering the live event 10. Indeed, the software application may be required as an authentication factor to have a 3D model 124 created for the user 102. As detailed further below, the 3D model 124 provides a virtual user likeness that can be incorporated into A/V content 110 of the live event 10 to create an event of enhanced immersive experience. To do so, a capture device 122 is used to scan the user 102 and build the 3D model 124. The software application may provide authorization for the user 102 to initiate the scanning by the capture device 122. In some embodiment, the 3D model 124 may be a photorealistic representation of the user or may be a digital avatar that is not photorealistic but represents features of the user.

In some embodiments, the capture device 122 may be the user's device itself. Thus, the user may use the software application to upload images to be used in creating the 3D model, such as taking images with a camera of the device, selecting particular images from a library of images stored on the device or in a cloud service associated with the user, or any other source of images. The images may include one or more images from one or more angles or view of the user to re-create the images in a three-dimensional representation. In some embodiments, the user may upload images of just the user, or of the user with others taken before or during the live event 10 for insertion in the A/V content 110. In some embodiments, the others in the user's images may include other users with indicia associated with purchased tickets, others without indicia, or any combination thereof. For example, the software application may verify that all people in the uploaded photo are associated with indicia of a purchased ticket to ensure only those that have tickets to attend the live event 10 may be inserted in the A/V content 110.

In some embodiments, the software application may provide photo editing features to augment the photos, e.g., with one or more filters, modifications, superimposed digital objects (e.g., "clip art"), among other editing features. The edited images may then be uploaded for insertion into the A/V content 110.

In some embodiments, the software application may provide a choice of scenes, songs, sets, images, settings, among other selections in which to insert the 3D model of the user. For example, the user may select to be inserted into a scene where the 3D model is rendered as a passenger on an airplane or rocket ship. The selection may be a preference that does not guarantee insertion in the selected point. In some embodiments, the selection may be for insertion into a particular point in the live event 10, into a recording of the event (e.g., a recorded event 20 as detailed below), or both.

In some embodiments, the user 102 may provide payment, e.g., via the software application and/or referencing the indicia or other identification of the user, to purchase one or more tiers of experience for the fused immersive content 140. In some embodiments, the purchase may be from amongst a number of purchase options. The purchase options may include, e.g., a number of scenes 112 in which the user's 102 3D model 124 is inserted, one or more "premium" insertions (e.g., particular high value fusion points and/or scenes 112), a length of insertion within one or more scenes 112 of the live event 10, a number of copies the user 102 may download after the live event 10, a copy without a watermark, a high resolution copy, among others or any combination thereof. The software application may present such options and the content fusion engine 130 to generate the purchased option according to aspects of embodiments of the present disclosure as further detailed below.

In some embodiments, the content fusion engine 130 may include a fusion point selection engine 132, a positioning/orientation engine 134, filter(s) 136, a dynamic effects engine 138, a rendering engine 150 and a 3D modelling engine 120, as well as one or more additional compute and storage resources, such as one or more processors and data stores of one or more computing devices, servers, cloud platforms, etc.

System Overview

In some embodiments, the immersive experience system 100 may include hardware components such as a processor, which may include local or remote processing components. In some embodiments, the processor may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor may include data-processing capacity provided by the microprocessor. In some embodiments, the microprocessor may include memory, processing, interface resources, controllers, and counters. In some embodiments, the microprocessor may also include one or more programs stored in memory.

Similarly, the immersive experience system 100 may include data store, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the data store may include, e.g., a suitable non-transient computer readable medium such as, e.g., random access memory (RAM), read only memory (ROM), one or more buffers and/or caches, among other memory devices or any combination thereof.

In some embodiments, the immersive experience system 100 may implement computer engines for the fusion point selection engine 132, the positioning/orientation engine 134, the filter(s) 136, the dynamic effects engine 138, the rendering engine 150 and the 3D modelling engine 120. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each of the fusion point selection engine 132, the positioning/orientation engine 134, the filter(s) 136, the dynamic effects engine 138, the rendering engine 150 and the 3D modelling engine 120 may include dedicated and/or shared software components, hardware components, or a combination thereof. For example, one or more of the fusion point selection engine 132, the positioning/orientation engine 134, the filter(s) 136, the dynamic effects engine 138, the rendering engine 150 and the 3D modelling engine 120 may include a dedicated processor and storage. However, in some embodiments, some or all of the fusion point selection engine 132, the positioning/orientation engine 134, the filter(s) 136, the dynamic effects engine 138, the rendering engine 150 and the 3D modelling engine 120 may share hardware resources, including the processor and data store of the immersive experience system 100 via, e.g., a bus.

Overview of A/V Content

In some embodiments, the content fusion engine 130 may receive one or more feeds of the A/V content 110 including audio 114 and/or imagery 116 of one or more scenes 112. In certain examples, a scene 112 may refer to a portion of the A/V content 110, including a set of frames of imagery 116, a segment of audio 114 and/or one or more virtual settings depicted in the imagery. The virtual setting may refer to the surroundings of the user 102 (e.g., a setting in which the user 102 is virtually or physically located), while in other examples, a virtual setting may refer to a scene that is distinct from the setting that actually surrounds the user 102 (e.g., a setting in a different place than where the user 102 is located). A setting may be associated with a real-world event such as a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event that may interest potential users 102. In the same or other examples, the real-world scene may be associated with a setting for a fictionalized or simulated scene (e.g., a set of a live-action virtual reality television show or movie) and/or any other scene at any other indoor or outdoor real-world location as may serve a particular implementation.

Other immersive settings described herein may not be real-world settings, but, rather, may be at least partially artificially generated. For example, certain immersive settings may be completely virtual (e.g., such as computer-generated virtual worlds used in video games). Other immersive settings may be based on real-world settings, but may include one or more virtual objects or other elements that have been added to the real-world setting or have replaced real objects or other elements within the real-world setting. For example, as will be described in detail below, custom immersive settings may be dynamically generated from original immersive settings (e.g., real-world settings or artificially generated settings) by replacing original objects within the original immersive settings with custom objects according to methods and system described herein.

As used herein, an "object" (e.g., an original object, a custom object, etc.) included in a setting, may include anything, whether living or inanimate, that is associated with (e.g., located within or around) the setting represented in the scene 112. For example, as will be described and illustrated below, if a scene 112 includes a conference room in an office setting, objects associated with the scene may include a conference table, chairs around the conference table, people in the conference room and their effects (e.g., clothing, papers, briefcases, coffee mugs, etc.), a floor in the room, a ceiling in the room, doors and/or windows around the edges of the room, walls of the room, and/or other objects present within and/or otherwise associated with the conference room.

As will be described and illustrated below, a content fusion engine 130 may dynamically customize a scene 112 and the setting thereof (e.g., customizing an original immersive scene to dynamically generate a custom immersive scene) for presentation to a user 102 in any way described herein and/or as may serve a particular implementation. For example, the content fusion engine 130 may detect a selection, by a user 102, automatically and/or randomly, of a fusion scheme to be applied to a scene 112 to be experienced by the user 102 by way of one or more display devices 160, including, e.g., one or more two-dimensional displays, one or more three-dimensional capable displays, one or more holograms, one or more virtual reality, augmented reality and/or mixed reality devices, among other output devices or any combination thereof. For example, the virtual/augmented/mixed reality device may be implemented by an immersive headset device or another device capable of providing or facilitating a virtual/augmented/mixed reality experience, as described in more detail below.

Creating the 3D Model of the User

In some embodiments, prior to the event 10, the users 102 may have 3D models 124 created for insertion into the A/V content 110. To do so, a user 102 may have one or more capture devices 122 capture imagery of the user 102 using a 3D scanning technique. In some embodiments, 3D scanning is the process of capturing data of a real-world object or environment to collect three dimensional data of its shape and possibly its appearance (e.g. color). The collected data can then be used to construct digital 3D models 124.

In some embodiments, 3D scanning techniques may include one or more of different technologies, such as optical technology (e.g., cameras such as the camera of the user's smartphone or other camera), structured-light 3D scanners, LiDA® and Time Of Flight 3D Scanners among others or any combination thereof.

The "picture" produced by a 3D scanner describes the distance to a surface at each point in the picture. This allows the three dimensional position of each point in the picture to be identified. Accordingly, in some embodiments, the 3D model 124 may include a polygon mesh or point cloud of geometric samples on the surface of the user 102. These points may be used to extrapolate the shape of the user 102 to perform reconstruction of the user 102 as the 3D model 124. In some embodiments, the colors or textures on the surface of the user 102 (e.g., on the skin, hair or clothing) can also be determined.

In some situations, a single scan may not produce a complete model of the subject.

Accordingly, in some embodiments, multiple scans, from different directions via one or more cameras, may be employed to obtain data for all sides of the user 102. Upon scanning each side, in some embodiments, the individual scans may be aligned and/or registered to bring all scans into a common reference system, and then merged to create a complete 3D model 124.

In some embodiments, the capture device 122 may include devices of one or more different technologies including optical, acoustic, laser scanning, radar, thermal, and seismic. In general, the capture device 122 may employ non-contact 3D scanning equipment.

In some embodiments, the non-contact 3D scanning equipment may include active and/or inactive equipment. For example, active scanners may emit some radiation or light and detect its reflection or radiation passing through object in order to probe an object or environment. Possible types of emissions used include light, ultrasound or x-ray. For example, the capture device 122 may include time-of-flight scanner(s) such as a time-of-flight 3D laser scanner. A time-of-flight 3D laser scanner may include an active scanner that uses laser light to probe the user 102 using a time-of-flight laser range finder. The laser range finder finds the distance of a surface by timing the round-trip time of a pulse of light. A laser is used to emit a pulse of light and the amount of time before the reflected light is seen by a detector is measured. Since the speed of light is known, the round-trip time determines the travel distance of the light, and thus the distance from the scanner of the surface, e.g., skin, hair, clothing, glasses, headwear, jewelry, etc.

In some embodiments, the laser range finder may detect the distance of one point in its direction of view. Thus, the 3D laser scanner may scan across a field of view one or more points at a time by changing the range finder's direction of view to scan different points. In some embodiments, the view direction of the laser range finder can be changed, e.g., by rotating the range finder itself, by using a system of rotating mirrors, or by other technique or any combination thereof.

In some embodiments, non-contact active capture device 122 may include triangulation. A triangulation based 3D laser scanners may shines a laser on the subject and exploits a camera to look for the location of the laser dot. Depending on how far away the laser strikes a surface, the laser dot appears at different places in the camera's field of view. The distance from the capture device 122 may be determined by triangulating based on the dot, the camera and laser emitter, which form a triangle. The length of one side of the triangle, the distance between the camera and the laser emitter is known. The angle of the laser emitter corner is also known. The angle of the camera corner can be determined by looking at the location of the laser dot in the camera's field of view. These three pieces of information fully determine the shape and size of the triangle and give the location of the laser dot corner of the triangle. In some embodiments, a laser stripe or laser dot may be used for triangulation, and may be swept across the user 102 to speed up the acquisition process.

For example, passive non-contact scanners may not emit radiation themselves, but rely on detecting reflected ambient radiation. Examples of passive non-contact 3D scanners may include scanners that detect visible light because visible light is a readily available ambient radiation. Other types of radiation, such as infrared could also be used.

In some embodiments, such passive technologies may include stereoscopic systems that employ two or more video cameras, spaced apart and directed at the user 102. By analyzing the differences between the images seen by each camera, the distance at each point in the images may be determined, e.g., using similar triangulation calculations to those detailed above.

In some embodiments, such passive technologies may include photometric systems using, e.g., a single camera taking multiple images under varying lighting conditions. Using the multiple images, the image formation model may be inverted in order to recover the surface orientation at each pixel.

In some embodiments, such passive technologies may include silhouette techniques that use outlines created from a sequence of photographs around a three-dimensional object against a contrasted background (e.g., green, white, blue or other color screen). The silhouettes may be extruded and intersected to form a visual hull approximation of the user 102.

In some embodiments, may extract data representing the user 102 from a background with or without a contrasted background using edge detection-based extraction. In some embodiments, the silhouette of the user may be extracted using automatic edge detection. In some embodiments, edge detection may examine the edges of a spatially filtered data stream by checking on a pixel-by-pixel basis for optical noise around the periphery of the images of the user 102.

The edges of the data of the user 102 extracted by the extraction module from the depth data stream are also automatically assessed by the edge analyzer module 117. Once again, optical noise is assessed along the edges of the user's 102 data of the user 102 image stream. The 3D modelling engine 120 then selects the data of the user 102 with the best edge performance for handling by the processor.

In some embodiments, the 3D modelling engine 120 can also select data that is a combination of spatial image data and depth sensed image data. That is, the user's 102 image may be based on the spatial image processed data stream as to the bulk of the user's 102 face and body, and the edge data pixels may be provided by the depth image data and vice versa.

Thus, because depth sensed data streams are subject to distortion, discoloration and other errors and artifacts that limit image quality and the processing of depth data may burden processors, memory and bandwidth capabilities of the system, the image data may be employed to correct for errors.

In some embodiments employing depth data and spatially filtered data, a mask and a logic operation can be utilized. The mask may be provided by the depth map. Within the mask, the logical AND operation may be executed between the RGB pixels from the depth sensor and the RGB pixels from the spatial filter. Pixels from the spatial filter outside the edges detected will be discarded. Pixels resulting from the AND operation within the silhouette may be passed on for processing, transmission, reception, transplantation and display.

In this embodiment, a depth map may be combined with the result of the exclusive NOR operation to yield a point cloud of RGB-D or RGBA-D data.

In some embodiments, the scanning device 122 may output 3D data representative of at least a portion of the user 102, such as the head, head and neck, head neck and shoulders, or other portion of the user's 102 body. In some embodiments, the 3D modelling engine 120 may use the 3D date to construct a 3D model that depicts the portion of the user 102. In some embodiments, to construct the model, the 3D data may be analyzed to identify key-points of the user, such as face, mouth, nose, eyes, ears, hair, chin, neck, body, etc.

To do so, the 3D modelling engine 120 may apply one or more object detection models. In some embodiments, object detection may employ neural network-based and/or non-neural approaches. For non-neural approaches, the 3D modelling engine 120 may define features using one of the methods such as, e.g., Viola-Jones object detection framework based on Haar features, Scale-invariant feature transform (SIFT), Histogram of oriented gradients (HOG) features, or other feature detection model or any combination thereof. Upon detecting features, the 3D modeling engine 120 may classify the features using one or more classification algorithms, such as, e.g., a support vector machine (SVM) or other classifier or any combination thereof.

For neural network-based techniques the 3D modelling engine 120 may perform end-to-end object detection without defining features using one or more neural networks, such as a convolutional neural networks (CNN). In particular, examples of CNNs for neural network-based object detection may include, e.g., Region Proposals (R-CNN, Fast R-CNN, Faster R-CNN, cascade R-CNN.), Single Shot MultiBox Detector (SSD), Single-Shot Refinement Neural Network for Object Detection (RefineDet), Retina-Net, Deformable convolutional networks, among others or any combination thereof.

In some embodiments, the 3D modelling engine 120 may be configured to utilize one or more exemplary AI/machine learning techniques for object detection of user 102 features, the AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

As a result, in some embodiments, the 3D modelling engine 120 may produce the 3D model 124 of the user 102. In some embodiments, to facilitate fusing the 3D model 124 with the imagery 116 of the scene(s) 112, the 3D modelling engine 120 may establish a coordinate system for the 3D model. For example, the point clouds produced by 3D scanners and/or 3D imaging can be used directly for measurement and visualization within a virtual environment along with other objects and data, such as the imagery 116.

In some embodiments, to refine the 3D model 124, the 3D modelling engine 120 using, e.g., volume rendering, image segmentation, image-based meshing or other segmentation techniques to separate the user 102 in the 3D model from any additionally captured data such as a background or nearby object. In some embodiments, In some embodiments, volume rendering may include leveraging the property that different parts of an object may have different threshold values or greyscale densities. From this, a 3-dimensional model can be constructed and displayed on screen. Multiple models can be constructed from various thresholds, allowing different colors to represent each component of the object.

In some embodiments, image segmentation may include may, where different structures have similar threshold/greyscale values, employ manual or automatic procedures that remove unwanted structures from the image. Image segmentation software may allow export of the segmented structures for further manipulation.

In some embodiments, image-based meshing may include an automated process of generating an accurate and realistic geometrical description of the scan data.

In one or more additional or alternatively embodiments, the capture device 122 may include stereo imaging equipment with 3D data acquisition and object reconstruction using, e.g., photogrammetry. In some embodiments, photogrammetry may be based on a block of overlapped images for 3D mapping and object reconstruction using 2D images. The process may include manually digitizing a number of points to be used for automatically reconstructing the 3D objects. A reconstructed object may be validated by superimposition of wire frame graphics in the stereo model. Photogrammetry may employ one or more photogrammetry software products such as, e.g., Agisoft Metashape, RealityCapture, and ENSAIS Engineering College TIPHON (Traitement d'Image et PHOtogrammétrie Numérique).

In some embodiments, the 3D modelling engine 120 may utilize point-cloud techniques to reconstruct the 3D model 124 from the scanning/imaging data from the capture device 122. In some embodiments, the captured image(s) of the immersive experience is obtained by collecting real-world sound-visual scenarios through a capture device 122. In one implementation, the capture device 122 may refer to a hardware component arranged in the immersive experience system 100. For example, the capture device 122 refers to a microphone, a camera, a sensor, etc. of the terminal. In another implementation, the capture device 122 may also be a hardware apparatus connected to the immersive experience system 100, such as a camera connected to a server, used for providing an acquiring service of the captured image(s) of the immersive experience for the immersive experience system 100. The capture device 122 may include, but is not limited to: an audio device, a camera device, and a sensing device. The audio device may include an audio sensor, a microphone, etc. The camera device may include an ordinary camera, a stereo camera, a light field camera, etc. The sensing device may include a laser device, a radar device, etc. The number of the capture device 122 may be multiple, and these capture device 122 are deployed in some specific locations in a real space to simultaneously capture audio content and images from different angles within the space. The captured audio content and images remain synchronized in both time and space. Some embodiments may refer to the 3-dimension space captured image(s), used for providing a viewing experience with multiple degrees of freedom (such as 6DoF), collected by a capture device 122 deployed at a specific location as the immersive experience.

Figure 3:
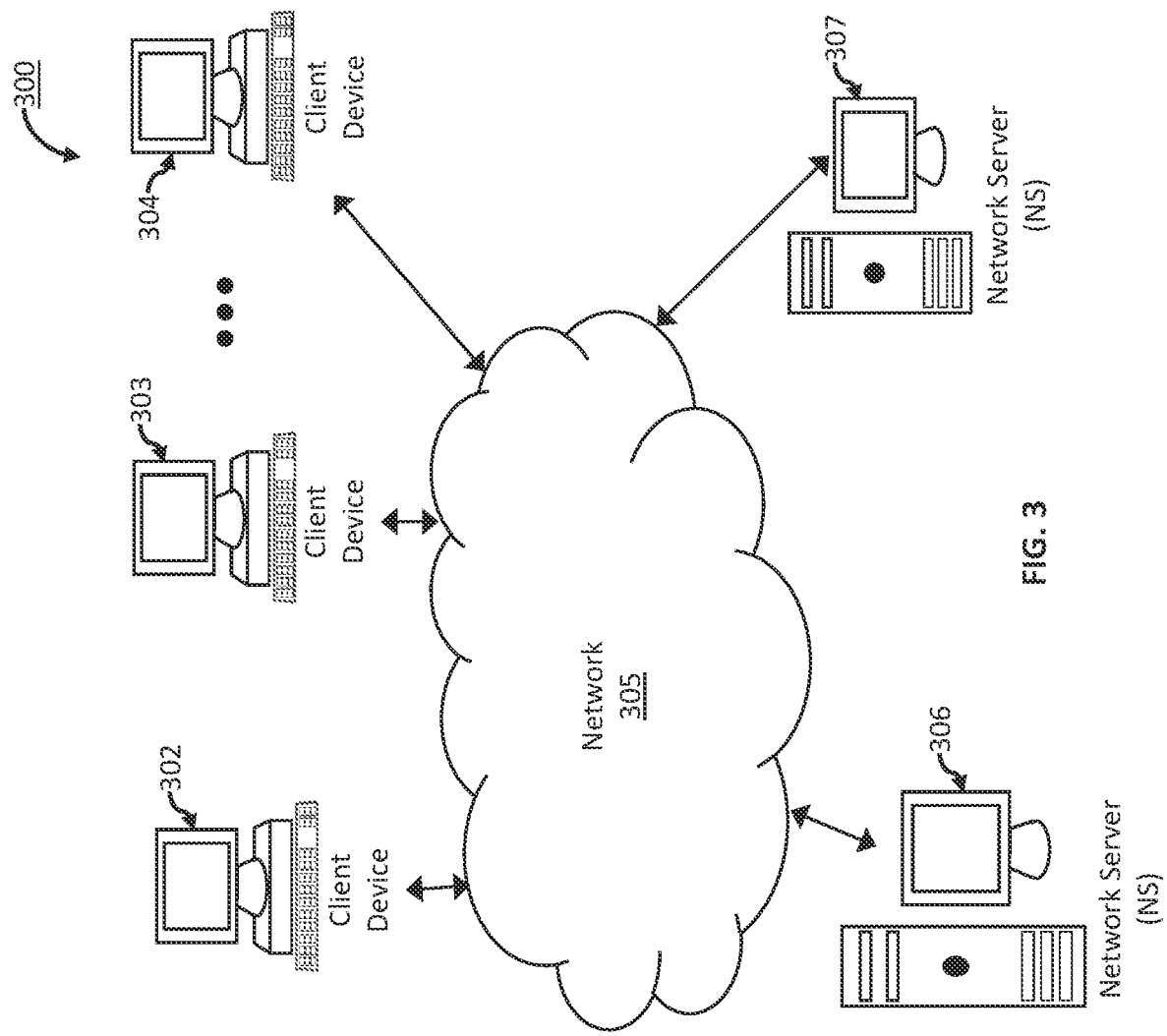
FIG. 3 depicts a block diagram of another exemplary computer-based system and platform for creating immersive experiences in accordance with one or more embodiments of the present disclosure.

For example, illustration is made by taking acquiring of the images of the immersive experience as an example. As shown in FIG. 3, a visual scenario 20A (such as a real-world visual scenario) may be captured by a set of camera arrays connected to the immersive experience system 100, or by a camera device with the plurality of cameras and sensors connected to the immersive experience system 100. A collection result may be source point cloud data 20B (i.e. the images of the immersive experience).

(2) The process of producing the captured image(s) of the immersive experience.

It is to be understood that the production process of the captured image(s) of the immersive experience involved in some embodiments may be understood as the content production process of the immersive experience, and the content production of the immersive experience here is mainly composed of content production in the form of point cloud data captured by the cameras or camera arrays deployed in multiple locations. For example, the immersive experience system 100 may convert the immersive experience from a 3-dimension representation to a 2-dimension representation. The immersive experience here may contain geometric information, attribute information, placeholder map information, image set data, etc. The immersive experience generally requires specific processing before encoding, for example, the point cloud data require cutting, mapping and other processes before encoding.

Specifically, collected and input 3-dimension representation data of the immersive experience (i.e. the point cloud data above) are projected onto a 2-dimension plane, usually in a mode of orthogonal projection, perspective projection, and equi-rectangular projection (ERP). The immersive experience projected onto the 2-dimension plane is represented by data from a geometric component, a placeholder component, and an attribute component, where, the data of the geometric component provides location information of each point of the immersive experience in the 3-dimension space, the data of the attribute component provides additional attributes (such as color, texture, or material information) of each point of the immersive experience, and the data of the placeholder component indicates whether data in other components is associated with the immersive experience.

The component data of the 2-dimension representation of the immersive experience are processed to generate blocks. According to the location of the immersive experience represented in the geometric component data, a 2-dimension plane region where the 2-dimension representation of the immersive experience is located is divided into a plurality of rectangular regions of different sizes. Each rectangular region is one block, and the block contains necessary information to back project the rectangular region into the 3-dimension space.

The blocks are packaged to generate the image set, the blocks are put in a 2-dimension grid, and it is ensured that effective parts of all the blocks do not overlap. The blocks generated by one immersive experience may be packaged into one or more image sets.

Corresponding geometric data, attribute data and placeholder data are generated based on the image set data, and the image set data, the geometric data, the attribute data and the placeholder data are combined to form the final representation of the immersive experience on the 2-dimension plane.

In some embodiments of the content production process of the immersive experience, the placeholder component may be omitted. In some embodiments of the content production process of the immersive experience, the attribute component may be omitted.

In addition, since the capture device 122 may capture panoramic video, such video is processed by the immersive experience system 100 and transmitted to the content consumption device for corresponding data processing, then the service object on the content consumption device side can view 360-degree video information by performing some specific actions (such as head rotation), while performing non-specific actions (such as moving the head) cannot obtain corresponding video changes, resulting in poor VR experience. Therefore, it is necessary to additionally provide depth information matching the panoramic video to enable the service object to obtain a better immersion degree and a better VR experience, which involves a 6DoF production technology. When the service object may move freely in the simulated scenario, it is called 6DoF. When using the 6DoF production technology to produce the images of the immersive experience, the capture device 122 generally selects a laser device, a radar device, etc. to capture the point cloud data in space.

In some embodiments, the 3D modelling engine 120 may output the 3D model 124. The 3D model 124 may include metadata including, e.g., the indicia associated with the user 102 so as to link the 3D model 124 to the user 102 for later access and retrieval.

Combining the User's Image with the Experience

In some embodiments, the content fusion engine 130 may create fused immersive content 140 by fusing the 3D model 124 with the imagery 116 of each scene in the A/V content 110. To do so, the content fusion engine 130 may identify a 3D model 124 to fuse with the imagery 116 at each scene based on predefined and/or dynamically generated fusion points within the imagery. In some embodiments, the fusion points may be predefined by embedding data in the imagery 116 identifying where 3D models 124 are to be integrated, e.g., based on pre-planned choreography of the A/V content 110. In some embodiments, the fusion points may be dynamically generated by random placement and/or object recognition to identify objects in the imagery 116 in which to integrate a 3D model 124 of a user 102. For example, the object recognition may be configured to use one or more machine learning models to identify objects matching to one or more defined classes that are pre-configured to be suitable for fusion with a 3D model 124 of a user 102, such as locations, vehicles, structures, windows, boats, among others or any combination thereof.

For example, in some embodiments, the scene(s) 112 may include, e.g., a rocket ship or airplane with windows. One or more users 102 may have 3D models 124 that can be fused at fusion points positioned to depict the users 102 as being within the windows of the rocket ship and/or airplane so as to add to the immersiveness of the scene 112. Similarly, in some embodiments, the scene(s) 112 may include a station wagon seen from behind, and the 3D model(s) 124 of the user(s) 102 may be fused at fusion points positioned so as to depict the user(s) 102 as being in the rear-facing seats of the station wagon looking back at point-of-view of the scene 112. Other examples are contemplated, such as other vehicles, stages of life, locations, landmarks, etc.

In some embodiments, to further add to the immersion of the scene, the A/V content 110 may be accompanied by sensory experiences. For example, the scene 112 of the station wagon may include an open window of the station wagon, which may be accompanied by the sensory experience of blowing wind (e.g., via a fan or blower, or other mechanism for moving air to simulate the blowing of wind or nay combination thereof. Similarly, scene(s) 112 may be accompanied by odors, movement of air, vibrations, among others or any combination thereof so as to create a "4-dimensional" (4D) experience to further add to the immersion. Examples of such 4D experiences are described in US Published Application 20170340982, US Published Application 20200246718, U.S. Pat. Nos. 9,830,949, 9,442,361, US Published Application 20170209804, U.S. patent Ser. No. 10/226,125, and US Published Application 20180098635, each of which is incorporated herein by reference in its entirety for all purposes.

Identify 3D Models and Fusion Points

In some embodiments, the imagery 116 of each scene 112 may include any number of fusion points, from zero to tens, hundreds or thousands of fusion points. In some embodiments, the fusion point selection engine 132 may map 3D models 124 of one or more users 102 to one or more of the fusion points within the imagery 116 so as to select fusion points at which to fuse a particular 3D model 124 of a particular user 102.

In some embodiments, the fusion point selection engine 132 may select 3D models 124 and fusion points using one or more selection techniques. In one or more embodiments, the fusion point selection engine 132 may select 3D models 124 to fuse into the imagery 116 by determining a number of users 102 eligible for fusing into the imagery 116 and a maximum number of fusion points in the imagery 116. As detailed above, the imagery 116 may include pre-defined fusions. Accordingly, the number of fusion points may be known a priori. However, where the fusion points are dynamically generated, the fusion point selection engine 132 may generate the fusion points in the imagery 116 and track the number of fusion points generated.

Based on the number of fusion points in the imagery 116, the fusion point selection engine 132 may determine a number of 3D models 124 from the eligible 3D models 124. The term "eligible" 3D models 124 refers to the number of users 102 that have provided 3D models 124 for fusion into the A/V content 110 (e.g., the number of users 102 that have bought entry or otherwise been granted access, a number of insertions and/or premium insertions that the users 102 have purchased, among other factors or any combination thereof as detailed above).

In some embodiments, each scene 112 may have one or more fusion points. Thus, in some embodiments, the fusion point selection engine 132 may select fusion points and 3D models 124 from the one or more users 102, and map 3D models 124 to selected fusion points. In some embodiments, the fusion points may be uniquely identifiable points in time and in image coordinates of a respective image of the imagery 116. Accordingly, a 3D model 124 can be mapped to a unique fusion.

In some embodiments, where there are more 3D models 124 than fusion points in the imagery 116, the fusion point selection engine 132 may randomly select from among the 3D models, e.g., using the indicia associated therewith. In some embodiments, there may be a new random selection for the imagery 116 of each scene 112. In some embodiments, once a 3D model 124 is selected for insertion at a particular fusion point, that 3D model 124 may be removed the set of eligible 3D models 124 until the rest of the 3D models 124 have also been selected for respective fusion points. Alternatively or additionally, the fusion point selection engine 132 may keep a selected 3D model 124 in the set of eligible 3D models 124 for a next scene 112 and/or for another fusion point in a given scene 112.

In some embodiments, the fusion point selection engine 132 may be configured to only use a 3D model 124 once during the event 10. Thus, upon selecting a 3D model 124 for a particular selected fusion point, the 3D model 124 may be removed from the set of eligible 3D models 124 for the rest of the A/V content 110 of the live event 10. Alternatively or additionally, each user 102 may have more than one entries as eligible 3D models 124 up to a maximum number of entries, such as 3, 4, 5, 6, 7, 8, 9, 10 or more. In some embodiments, the maximum may be preconfigured or programmatically determined based on the number of users 102 attending the live event 10.

In some embodiments, one or more scenes 112 may include multiple fusion points. Accordingly, the fusion point selection engine 132 may select multiple fusions points and multiple 3D models 124 for fusion to enable multiple users 102 to concurrently be inserted into the one or more scenes 112.

Positioning and Orienting the 3D Models at the Fusions Points

The content fusion engine 130 may include the positioning/orientation engine 134 to position and orient the 3D model 124 relative to a particular fusion point. Hence, the positioning/orientation engine 134 manages a coordinate system (such as a 3-axis coordinate system, including cartesian coordinates, polar coordinates, spherical coordinates, or other coordinate system or any combination thereof) of the scene 112 (including a reference orientation and/or an orientation towards one or more particular key-points or objects). Thus the positioning/orientation engine 134 monitors and stores the position and orientation of the 3D model 124 relative to the setting of the scene 112.

In some embodiments, each of which having metadata of the fusion point that define how to pose the 3D model 124 at the fusion point. The attributes may include data describing the setting, such as position in the imagery 116, lighting effects, style and tone of the imagery 116, environment, objects in proximity to the fusion point, etc. The attributes may include data describing a viewing direction or object at which attention of the 3D model 124 is intended to be directed. In some embodiments, the metadata may include a reference to a separate file (e.g., a configuration file or data object(s), etc.) that stores the attributes, may include the attributes themselves, or a combination thereof. Thus, the fusion points may specify data relevant to posing and modifying the 3D model 124 to integrate the 3D model 124 into the scene.

Accordingly, the positioning/orientation engine 134 may access the metadata of the fusion point for which the 3D model 124 has been selected. Based on the metadata, the positioning/orientation engine 134 may modify the 3D model 124 for the scene by adjusting the pose of the 3D model 124 to match the imagery 116. For example, the node coordinates of the 3D model 124 can be adjusted to position and orient the 3D model 124 so that the 3D model 124 is facing a particular direction, such as towards a particular object, out of a window, through a space, among other orientations or any combination thereof.

In some embodiment, each object in the scene 112 may have a node (or family of nodes), representing the position of the object in the coordinate system. In addition to a node (or family of nodes), each object may have an orientation, relative to a reference orientation of the 3-axis coordinate system of the virtual environment. Any movement of object (e.g., change in node coordinates) is monitored and stored, and shared to update the imagery 116 of the scene(s) 112. Likewise, the 3D representations may be provided with a user 102 specific position and/or orientation when received from the 3D modelling engine 120, such that the orientation and/or position of the user's 102 3D model 124 within the setting of the scene 112 may be determined so as to enable the positioning/orientation engine 134 to place the 3D model 124 at the selected points in the scene(s) 112 and orient the 3D model 124 such that the representation of the user 102 faces one or more objects and/or in a particular direction relative to the reference orientation.

In some embodiments, the imagery 116 of the scene(s) 112 may be stored in a file format that supports layering such that the imagery 116 is a composite of layers of imagery, such as in Adobe Photoshop format (.psd), among others or any combination thereof. In some embodiments, where the imagery 116 is layered, the 3D model 124 can be inserted at a fusion point as a top layer, a base layer or any layer in between so at to enable the 3D model 124 to be occluded, partially or wholly, by other objects and/or items in the imagery 116 based on the attributes in and/or referenced by the metadata.

Applying Image Filters for Style and Tone

In some embodiments, the content fusion engine 130 may include the filter(s) 136 that are configured to modify the 3D model 124 to match style and coloring of the scene 112. For example, the attributes in and/or referenced by the metadata of the fusion point for which the 3D model 124 has been selected may specify style, coloring, blur, among others or any combination thereof. The style, coloring, blur, etc. may be constant or repetitive throughout the scene 112, or may be variable via a predefined choreography and/or random variation. Accordingly, the content fusion engine 130 may use filter(s) 136 to integrate into the 3D model 124 the scene 112.

In some embodiments, the positioning/orientation engine 134 may generate a self-occlusion map for the 3D model 124. In particular, the positioning/orientation engine 134 generates the self-occlusion map by determining one or more portions of the 3D model 124 that occlude one or more other portions of the 3D model 124. More specifically, the positioning/orientation engine 134 determines a plurality of points of the 3D model 124 visible within a rendering perspective based on a camera position and camera view of a camera within three-dimensional space. Additionally, for each of the points of the 3D model 124, the positioning/orientation engine 134 samples a plurality of rays directed from the corresponding point to determine whether the rays intersect (e.g., hit) any other portion of the 3D model 124. The positioning/orientation engine 134 then stores the values for the sampled rays for each point within the self-occlusion map.

In some embodiments, filter(s) 136 may include one or more post-processing effects to be applied to the 3D model 124 to match the style, brightness and/or coloring of the imagery 116. For example, the filter(s) 136 may include color and tone filters, such as, e.g., exposure, contrast, brightness, lighting, shadow, and other filters or any combination thereof. The filter(s) 136 may employ one or more style filters such as, e.g., image blur, grayscale, matte, sepia tone, vintage, among others or any combination thereof. Thus, for example, for imagery 116 that is grayscale, the filter(s) 136 may modify the 3D model 124 to be grayscale.

In some embodiments, the filter(s) 136 may include machine learning-based filtering and processing to match the imagery 116.

For example, the filter(s) 136 may process the 3D model 124 to determine visual attributes of the 3D model 124. In particular, the filter(s) 136 generates a digital mask of the 3D model 124 for use with inserting the 3D model 124 into the imagery 116. For instance, the digital mask includes a foreground mask indicating a shape of the 3D model 124 relative to the imagery 116. In some embodiments, the digital mask includes an alpha mask with values indicating whether each pixel of a plurality of pixels correspond (or partially correspond) to the 3D model 124.

In some embodiments, the filter(s) 136 may also generate a normal map of the 3D model 124. For example, the filter(s) 136 generates the normal map by determining normal values for points of the 3D model 124. Thus, the filter(s) 136 determines normal directions for portions of the 3D model 124 based on the position and shape of visible portions of the 3D model 124 relative to the rendering perspective based on the camera position and the camera view. The filter(s) 136 may then generate the normal map by determining and storing a surface slope of the 3D model 124 for each of a plurality of pixels based on a rendering resolution according to the rendering perspective.

In some embodiments, the filter(s) 136 generates an albedo map for the 3D model 124. For instance, the filter(s) 136 determines base color values of the 3D model 124 and stores the base color values within the albedo map. For example, the filter(s) 136 may determine the base color values of visible portions of the 3D model 124 from the rendering perspective according to the camera position and camera view. Additionally, the filter(s) 136 determines the color values associated with each portion of the 3D model 124 for each of a plurality of pixels from the rendering perspective based on a rendering resolution.

In some embodiments, the filter(s) 136 may utilize a machine learning model, such as a neural network, e.g., a generator neural network, to generate a shading map. For example, the filter(s) 136 utilizes the generator neural network to determine accurate color values for a plurality of pixels according to the rendering perspective based on color, curvature, and shading information in the representation of the 3D model 124. For example, the filter(s) 136 may utilize the generator neural network to generate the shading map utilizing the self-occlusion map 308, the normal map, and the albedo map as inputs to the generator neural network.

In some embodiments, after generating the shading map, the filter(s) 136 generates a fused immersive content 140. Specifically, the filter(s) 136 utilizes the shading information and additional information from the representation of the 3D model 124 to generate the fused immersive content 140. For instance, the filter(s) 136 synthesizes the fused immersive content 140 from the digital mask, the albedo map, and the shading map. In some embodiments, the filter(s) 136 utilizes a multiplication operation to multiply values in the digital mask, the albedo map, and the shading map to generate the color values of pixels corresponding to the 3D model 124 inserted into the imagery 116. By utilizing the lighting and shading information associated with the imagery 116 and the 3D model 124 to generate the fused immersive content 140, the filter(s) 136 ensures that the lighting of the imagery 116 and 3D model 124 are consistent.

Applying Other Effects to the 3D Models

In some embodiments, the content fusion engine 130 may include the dynamic effects engine 138 that is configured to modify the 3D model 124 to match conditions and actions in the setting of the scene 112. For example, the attributes in and/or referenced by the metadata of the fusion point for which the 3D model 124 has been selected may specify dynamic conditions, such as wind blowing at a particular intensity in a particular direction, rain or water falling on the 3D model 124, lighting intensity, color and direction, among other dynamic conditions or any combination thereof. The dynamic conditions may be constant or repetitive throughout the scene 112, or may be variable via a predefined choreography and/or random variation.

Accordingly, in some embodiments, the dynamic effects engine 138 may identify the dynamic conditions of the scene 116 and apply matching dynamic effects, such as, e.g., wind, rain and/or light variations on the 3D model 124 corresponding to the dynamic conditions.

Rendering the Fused Immersive Content, e.g., During the Live Event

In some embodiments, the fused immersive content 140 produced by fusing the 3D models 124 into the A/V content 110 may be output to one or more display devices 160 via a rendering engine 150. In some embodiments, the rendering engine 150 may include a rendering engine configured to output 2D and/or 3D imagery using 3D models. For example, the rendering engine 150 may include one or more rendering software engines such as a gaming engine including Unity™, Unreal Engine™, or other 3D rendering engine or any combination thereof.

In some embodiments, the rendering engine 150 may use the 3D model 124 and 3D features of the imagery 116 to output 2D and/or 3D imagery that the display device(s) 160. In some embodiments, the rending engine 150 may create the 2D and/or 3D imagery using, e.g., rasterization, ray casting, ray tracing, path tracing, radiosity, among others or any combination thereof. As a result of one or more of the rendering techniques, the rendering engine 150 may apply to the fused immersive content 140 shading, texture-mapping, bump-mapping, fogging/participating medium, shadows, soft shadows, reflection, transparency or opacity, translucency, refraction, diffraction, indirect illumination, caustics, depth of field, motion blur, among others or any combination thereof.

In some embodiments, as a result, the rendering engine 150 may output to the display device(s) 160 of the live event 10. In some embodiments, the display device(s) 160 may include one or more flat displays (e.g., TVs, monitors, etc.), 3D capable screens (e.g., 3D TVs, etc.), holograms, VR headsets, smartphones, or other display devices and/or computing devices. In some embodiments, the rendering engine 150 may output the fused immersive content 140 to the display device(s) 160 using a web application, webpage, native application installed on the display device(s) 160, mirrored feed, local storage/caching and playback, among other playback techniques or any combination thereof.

In some embodiments, the ability of the display device 160 to render and display the fused immersive content 140 may be controlled using digital rights management (DRM) controls such a license or content key. For example, a license and/or content key request and/or provisioning process consistent with aspects of the disclosed embodiments may result in a DRM license and/or a content key, ck, being communicated to an authorized device that has requested and/or otherwise wishes to access, use, and/or render the fused immersive content 140. In certain embodiments, the content key may be included in the DRM license and communicated with the license and/or may be communicated separately from the DRM license.

In some embodiments, the display device 160 may provide a DRM service with a content request message. The content request message may comprise information identifying protected content that the display device 160 would like to access, use, and/or otherwise render (e.g., the fused immersive content 140), information relating to a type requested content access, and/or the like. In some embodiments, the content request message may be associated with the fused immersive content 140 that the display device 160 has or will downloaded and/or otherwise stored and would like to access, use, and/or render. In further embodiments, the content request message may be associated with content that the display device 160 would like to download and/or otherwise store for later use. In yet further embodiments, the content request message may be associated with content that the user would like to stream from a service (e.g., the 3D rendering engine 150 and/or another associated service provider).

The 3D rendering engine 150 may provide a DRM service with a content key, ck, associated with the fused immersive content 140 identified in the content request message and/or associated constraints. In some embodiments, the content key and/or associated constraints may be protected during transmission between the 3D rendering engine 150 and/or the DRM service (e.g., using suitable cryptographic encryption and/or other secure communication techniques). In certain embodiments, the constraints may articulate one or more requirements and/or parameters that the DRM service may use in connection with license generation processes.

The DRM service may generate a token based, at least in part, on the content key and the constraints received from the 3D rendering engine 150. In some embodiments, the token may comprise the content key provided by the 3D rendering engine 150, ck, encrypted with a symmetric key of the DRM service, ke. The token may be communicated from the DRM service to the 3D rendering engine 150.

In response to the content request message, the 3D rendering engine 150 may return to the display device 160 a message that includes the token provided by the DRM service and/or information that identifies (e.g., uniquely identifies) the associated fused immersive content 140.

The display device 160 may be associated with a public key secret-key pair, pica, ski. To obtain a license and/or associated content keys, ck, from the DRM service, the display device 160 may communicate a license request message to the DRM service. The license request message may comprise the information identifying the associated content, the token included in the message received from the 3D rendering engine 150, and/or the public key, pica, of the display device 160.

The DRM service may determine whether the display device 160 is authorized to access, use, and/or otherwise render the protected fused immersive content 140 associated with the license request message. If the display device 160 is authorized, the DRM service may issue a license to the display device 160. In certain embodiments, the license may comprise an encrypted copy of the content key, ck. For example, the license may comprise the content key, ck, encrypted with the public key, pica, of the display device 160. The license may further comprise various license terms and/or other associated license information that may be enforced by the display device 160 in connection with the accessing, use, and/or rendering of the protected fused immersive content 140. In certain embodiments, the encrypted content key may be communicated separately from other license information included in the license.

In some embodiments, the above detailed process may be performed for each user 102 attending the live event 10. In some embodiments, the content fusion engine 130 may be instantiated in multiple instantiations, e.g., using containers, virtual machines, or other instantiation technique or any combination thereof. Accordingly, the fusion of 3D models 124 with the A/V content 110 can be parallelized. In some embodiments, the fusion process may be performed prior to the live event 10 with pre-recorded A/V content 110 to be synchronized with a performance of the live event 10 so as to incorporate the users 102 into the performance.

Recorded Event Access, Viewing and Download

Figure 2A:
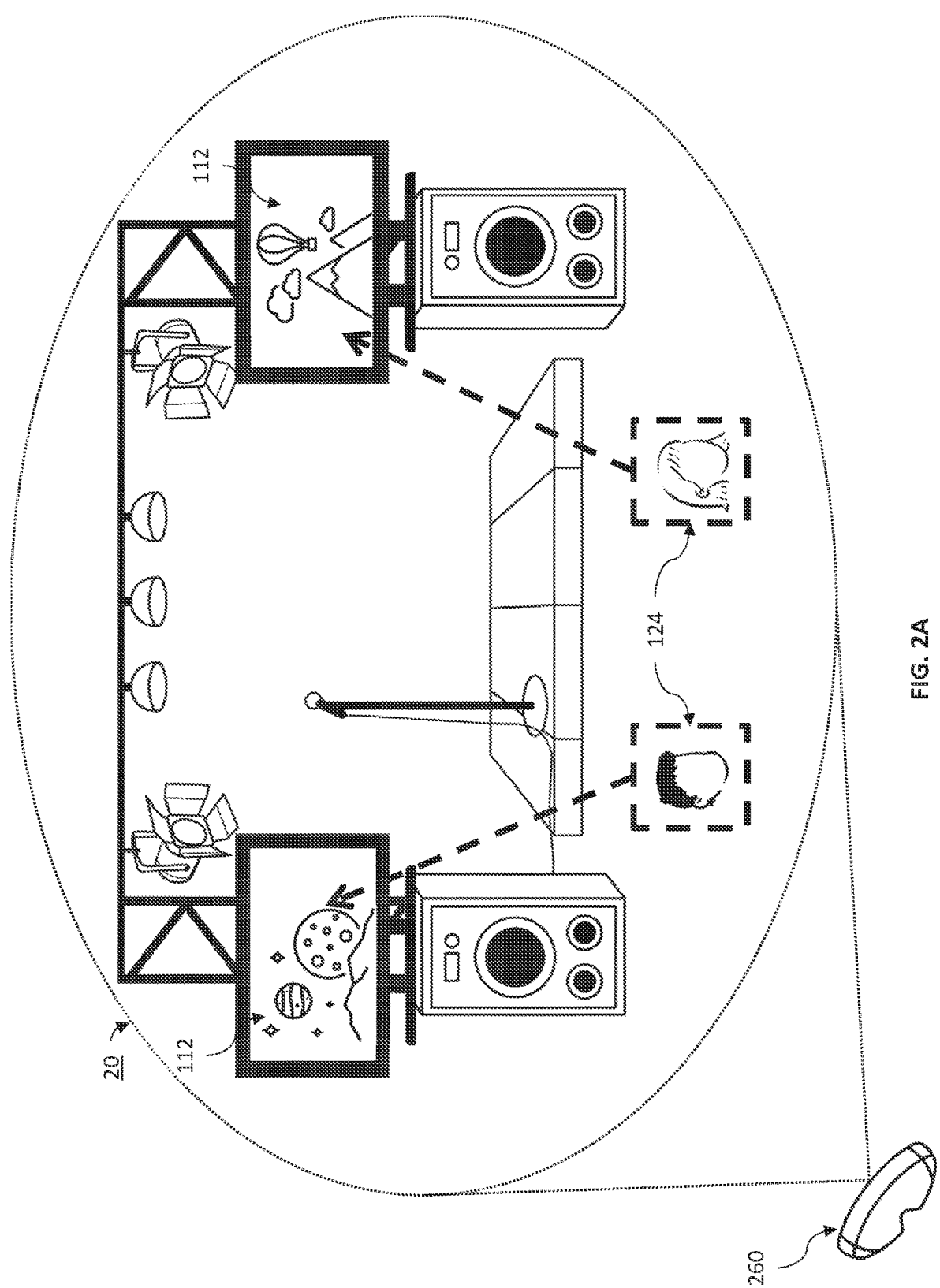
FIG. 2A and FIG. 2B depict a content fusion engine as fusing a 3-dimensional (3D) model 124 of one or more users 102 into A/V content 110 of a recorded event 20 in accordance with one or more embodiments of the present disclosure.
Figure 2B:
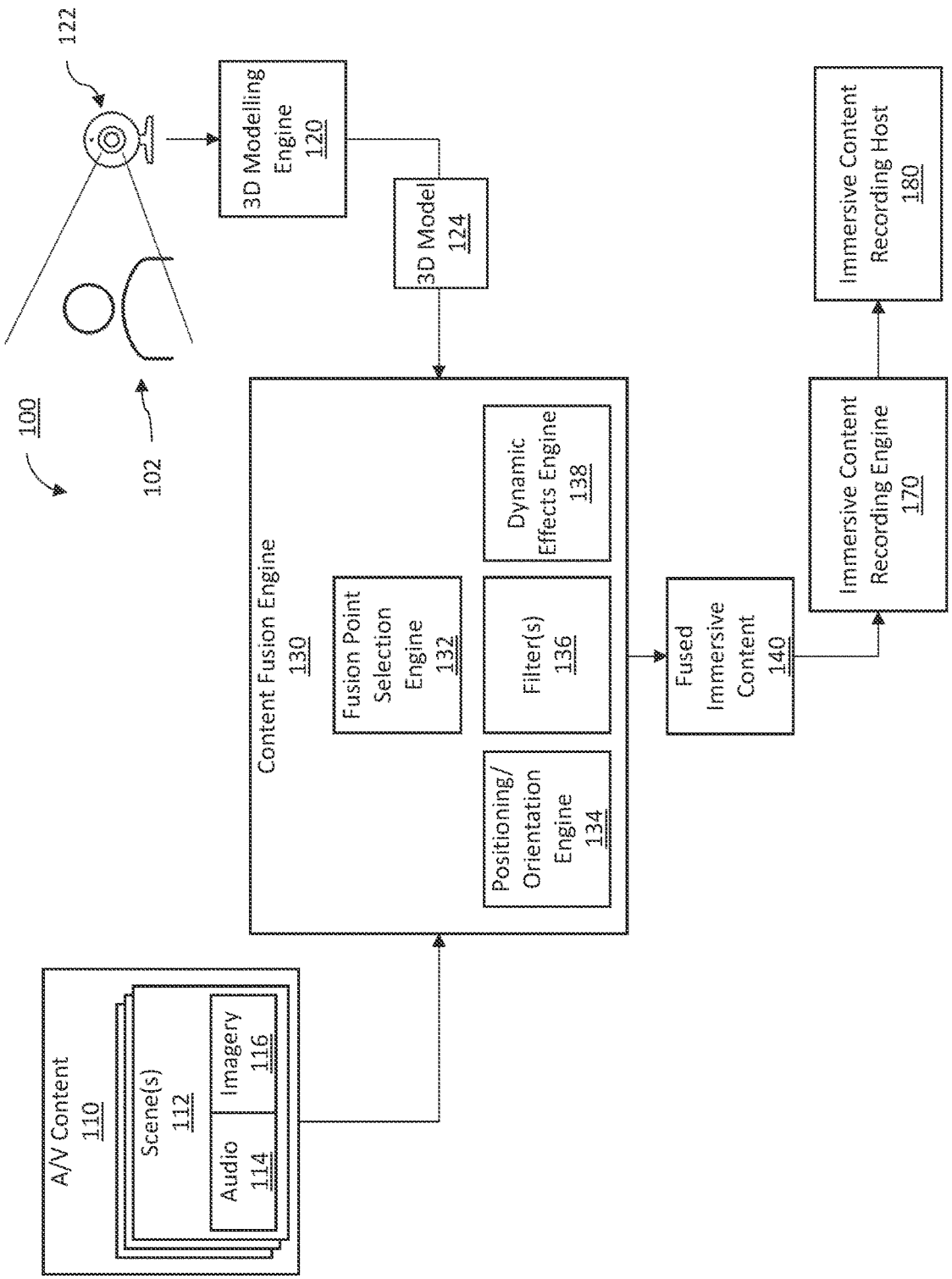

Referring to FIGS. 2A and 2B, a content fusion engine 130 is illustrated as fusing a 3-dimensional (3D) model 124 of one or more users 102 into A/V content 110 of a recorded event 20 in accordance with one or more embodiments of the present disclosure.

In some embodiments, the content fusion engine 130 may insert representations of users 102 into the A/V content 110 to create fused immersive content 140 whereby the users 102 may see themselves in scene(s) 112 depicted in the A/V content 110 in a 3D environment, such as augmented reality (AR), virtual reality (VR), mixed reality (MR), etc. (collectively referred to herein as "VR"). As is described in more detail below, the content fusion engine 130 may use pre-recorded A/V content 110 to insert the user's 102 representation after the fact into the pre-recorded A/V content 110. Indeed, the A/V content 110 may be associated with a performance, such as a concert, theater production, stand-up comedy show, lecture, circus, ballet, among others or any combination thereof. Thus, the user's 102 representation may be inserted into A/V content 110 of the performance during the performance and/or after the fact into a recording of the performance.

In some embodiments, the users 102 may have gained entry to a live event (e.g., the live event 10 detailed above), e.g., by buying a ticket, or otherwise acquiring a right to enter the live event. Upon doing so, the users 102 may be provided with a ticket for entry that may include indicia representing a uniquely identifiable code such as a ticket number, user number, username, randomly generated code, machine readable indicia (e.g., barcode, QR code, etc.), among other indicia or any combination thereof. In some embodiments, the ticket may be physical and/or electronic (e.g., on a smartphone application, webpage, Apple Wallet™, Google Pay™, Samsung Pay™, etc.). In some embodiments, the indicia of the ticket may identify the user such that the indicia may be stored in a database (e.g., an immersive content recording host 180 as detailed below) and linked to, e.g., the 3D model 124 associated with the user 102 as detailed below. Thus, each user 102 may be linked to their 3D model 124 for later access via a recorded event 20 representing a recording of the live event 10. In some embodiments, the ticket may be for a live or recorded virtual event, or a live or recorded physical event, or any combination thereof.

In some embodiments, at entry the user 102 may be provided the option to give user permissions to show the user 102 in imagery during and/or after the event, including in the recorded event 20 shown to the user or to others. In some embodiments, the permissions may be used to configure the content fusion engine 130 and/or rendering engine 150 to affect when and/or if the user 102 is to be represented in the content 110 of the recorded event 20. In some embodiments, the user 102 selecting to not give permission to store and/or use the user 102 in content after the recorded event 20 may cause the content fusion engine 130 to remove the 3D model 124 of the user 102 from any recordings of the recorded event 20 and from any databases storing the 3D models 124. Where the user 102 selects to not give permission to use the user 102 during the recorded event 20, the content fusion engine 130 may be configured to remove the user 102 and/or associated 3D model 124 from the set of users 102 eligible to be inserted into the content 110 of the recorded event 20. In some embodiments, even where the user 102 does not provide permission to use the user 102 before, during or after the recorded event 20, the user 102 may be provided, as detailed further below, a copy of the user's 102 3D model 124 and/or a recording and/or access to a recording of the recorded event 20 for fusion of the 3D model 124 into the recording for personal viewing and experience.

In some embodiments, the ticket may take the form of or may be associated with a software application (e.g., a smartphone application) for the recorded event 20. In some embodiments, the indicia may provide authentication to install and/or access the application. In some embodiments, the application may be granted device permissions, e.g., to monitor geo-location, control user access to a camera of the device, access an NFC and/or Bluetooth radio or other wireless communication radios, among other device permissions or any combination thereof. In some embodiments, the user may be required to present the software application, show a copy of the indicia (e.g., via QR code or barcode) using the software application, authenticate using the NFC and/or Bluetooth radio, among other mechanisms to authenticate the user's 102 access to the event, including to enter a live event and/or to access/enter a live replay of a recorded event 20 in a physical and/or virtual space, thus forming a digital or virtual ticket to the event. In some embodiments, upon being granted entry to the event, the software application, using an instruction from an authentication server and/or geo-location to detect the presence of the user 102 at the event. As a result, the software application may disable user access to the camera of the device and/or to social media and/or device usage in general, thus preventing the user 102 from recording the event or the device otherwise distracting the user 102 from the event.

In some embodiments, the software application may be installed in response to the user 102 scanning a QR code associated with the ticket and/or at the entrance to the event and/or at an exit of the event so as to trigger access to the recording of the event to view the recorded event 20. In some embodiments, the software application may be required as an authentication factor to have a 3D model 124 created for the user 102. As detailed further below, the 3D model 124 provides a virtual user likeness that can be incorporated into A/V content 110 of the recorded event 20 to create an event of enhanced immersive experience. To do so, a capture device 122 is used to scan the user 102 and build the 3D model 124. The software application may provide authorization for the user 102 to initiate the scanning by the capture device 122.

In some embodiments, the user 102 may provide payment, e.g., via the software application and/or referencing the indicia or other identification of the user, to purchase one or more clips and/or still imagery from of the fused immersive content 140. For example, the user 102 may access the software application and select a portion of the fused immersive content 140 to download and/or share to social media. In some embodiments, the purchased fused immersive content 140 may include a watermark identifying the event, the performer(s), a name of the software application, or other watermark to identify the source of the fused immersive content 140.

In some embodiments, the purchase may be from amongst a number of purchase options. The purchase options may include, e.g., a number of scenes 112 in which the user's 102 3D model 124 is inserted, one or more "premium" insertions (e.g., particular high value fusion points and/or scenes 112), a length of the recorded event 20, a number of copies, copy without a watermark, a high resolution copy, among others or any combination thereof. The software application may present such options and immersive content recording host 180 may segment the recorded event 20 and/or control the content fusion engine 130 to deliver the purchased option.

In some embodiments, the content fusion engine 130 may include a fusion point selection engine 132, a positioning/orientation engine 134, filter(s) 136, a dynamic effects engine 138, an immersive content recording engine 170, an immersive content recording host 180 and a 3D modelling engine 120, as well as one or more additional compute and storage resources, such as one or more processors and data stores of one or more computing devices, servers, cloud platforms, etc.

System Overview

In some embodiments, the immersive experience system 100 may include hardware components such as a processor, which may include local or remote processing components. In some embodiments, the processor may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor may include data-processing capacity provided by the microprocessor. In some embodiments, the microprocessor may include memory, processing, interface resources, controllers, and counters.

In some embodiments, the microprocessor may also include one or more programs stored in memory.

Similarly, the immersive experience system 100 may include data store, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the data store may include, e.g., a suitable non-transient computer readable medium such as, e.g., random access memory (RAM), read only memory (ROM), one or more buffers and/or caches, among other memory devices or any combination thereof.

In some embodiments, the immersive experience system 100 may implement computer engines for the fusion point selection engine 132, the positioning/orientation engine 134, the filter(s) 136, the dynamic effects engine 138, the rendering engine 150 and the 3D modelling engine 120. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each of the fusion point selection engine 132, the positioning/orientation engine 134, the filter(s) 136, the dynamic effects engine 138, the immersive content recording engine 170, the immersive content recording host 180 and the 3D modelling engine 120 may include dedicated and/or shared software components, hardware components, or a combination thereof. For example, one or more of the fusion point selection engine 132, the positioning/orientation engine 134, the filter(s) 136, the dynamic effects engine 138, the immersive content recording engine 170, the immersive content recording host 180 and the 3D modelling engine 120 may include a dedicated processor and storage. However, in some embodiments, some or all of the fusion point selection engine 132, the positioning/orientation engine 134, the filter(s) 136, the dynamic effects engine 138, the immersive content recording engine 170, the immersive content recording host 180 and the 3D modelling engine 120 may share hardware resources, including the processor and data store of the immersive experience system 100 via, e.g., a bus. Overview of A/V Content In some embodiments, the content fusion engine 130 may receive pre-recorded or live streaming the A/V content 110 including audio 114 and/or imagery 116 of one or more scenes 112. In certain examples, a scene 112 may refer to a portion of the A/V content 110, including a set of frames of imagery 116, a segment of audio 114 and/or one or more virtual settings depicted in the imagery. The virtual setting may refer to the surroundings of the user 102 (e.g., a setting in which the user 102 is virtually or physically located), including the A/V content 110 virtually displayed via virtual display devices in the recorded event 20. In some embodiments, the recorded event 20 may itself include 2D and/or 3D recording(s) of a live event (e.g., the live event 10 detailed above). In some embodiments, the recorded event 20 may itself include 2D and/or 3D stream(s), rather than recording(s), of a live event (e.g., the live event 10 detailed above). In some embodiments, the A/V content 110 may include 2D and/or 3D content choreographed as a part of the event, and thus is played back within the event as a part of the event.

In some embodiments, as detailed above, a virtual setting may refer to a scene that is distinct from the setting that actually surrounds the user 102 (e.g., a setting in a different place than where the user 102 is located).

As will be described and illustrated below, a content fusion engine 130 may dynamically customize the scene 112 and the setting thereof (e.g., customizing an original immersive scene to dynamically generate a custom immersive scene) for presentation to a user 102, e.g., in real-time during a live stream or during playback of the recorded event 20, or prior to playback of the recorded event 20. Thus, the below detailed techniques may be performed in real-time during playback or may be completed prior to playback. For example, the content fusion engine 130 may detect a selection, by a user 102, automatically and/or randomly, of a fusion scheme to be applied to a scene 112 to be experienced by the user 102 by way of one or more output devices 260, including, e.g., one or more two-dimensional displays, one or more three-dimensional capable displays, one or more holograms, one or more virtual reality, augmented reality and/or mixed reality devices, among other output devices or any combination thereof. For example, the virtual/augmented/mixed reality device may be implemented by an immersive headset device or another device capable of providing or facilitating a virtual/augmented/mixed reality experience, as described in more detail below.
Creating the 3D Model of the User In some embodiments, prior to the event 20, the users 102 may have 3D models 124 created for insertion into the A/V content 110. To do so, a user 102 may have one or more capture devices 122 capture imagery of the user 102 using a 3D scanning technique. In some embodiments, 3D scanning is the process of capturing data of a real-world object or environment to collect three dimensional data of its shape and possibly its appearance (e.g. color). The collected data can then be used to construct digital 3D models 124.

In some embodiments, 3D scanning techniques may include one or more of different technologies, such as optical technology, structured-light 3D scanners, LiDA® and Time Of Flight 3D Scanners among others or any combination thereof as detailed above.

As a result, in some embodiments, the 3D modelling engine 120 may produce the 3D model 124 of the user 102. In some embodiments, to facilitate fusing the 3D model 124 with the imagery 116 of the scene(s) 112, the 3D modelling engine 120 may establish a coordinate system for the 3D model. For example, the point clouds produced by 3D scanners and/or 3D imaging can be used directly for measurement and visualization within a virtual environment along with other objects and data, such as the imagery 116.

In some embodiments, to refine the 3D model 124, the 3D modelling engine 120 using, e.g., volume rendering, image segmentation, image-based meshing or other segmentation techniques to separate the user 102 in the 3D model from any additionally captured data such as a background or nearby object, e.g., as detailed above.

In some embodiments, the 3D modelling engine 120 may utilize point-cloud techniques to reconstruct the 3D model 124 from the scanning/imaging data from the capture device 122, e.g., as detailed above.

In some embodiments, the 3D modelling engine 120 may output the 3D model 124. The 3D model 124 may include metadata including, e.g., the indicia associated with the user 102 so as to link the 3D model 124 to the user 102 for later access and retrieval.
Combining the User's Image with the Recorded Experience In some embodiments, the content fusion engine 130 may create fused immersive content 140 by fusing the 3D model 124 with the imagery 116 of each scene in the A/V content 110. To do so, the content fusion engine 130 may identify the 3D model 124 of the user 102 to fuse with the imagery 116 at each scene based on predefined and/or dynamically generated fusion points within the imagery. In some embodiments, the fusion points may be predefined by embedding data in the imagery 116 identifying where 3D models 124 are to be integrated, e.g., based on pre-planned choreography of the A/V content 110. In some embodiments, the fusion points may be dynamically generated by random placement and/or object recognition to identify objects in the imagery 116 in which to integrate a 3D model 124 of the user 102. For example, the object recognition may be configured to use one or more machine learning models to identify objects matching to one or more defined classes that are pre-configured to be suitable for fusion with a 3D model 124 of the user 102, such as locations, vehicles, structures, windows, boats, among others or any combination thereof.

For example, in some embodiments, the scene(s) 112 may include, e.g., a rocket ship or airplane with windows. One or more users 102 may have 3D models 124 that can be fused at fusion points positioned to depict the users 102 as being within the windows of the rocket ship and/or airplane so as to add to the immersiveness of the scene 112. Similarly, in some embodiments, the scene(s) 112 may include a station wagon seen from behind, and the 3D model(s) 124 of the user(s) 102 may be fused at fusion points positioned so as to depict the user(s) 102 as being in the rear-facing seats of the station wagon looking back at point-of-view of the scene 112. Other examples are contemplated, such as other vehicles, stages of life, locations, landmarks, etc.

In some embodiments, to further add to the immersion of the scene, the A/V content 110 may be accompanied by sensory experiences. For example, the scene 112 of the station wagon may include an open window of the station wagon, which may be accompanied by the sensory experience of blowing wind (e.g., via a fan or blower, or other mechanism for moving air to simulate the blowing of wind or nay combination thereof. Similarly, scene(s) 112 may be accompanied by odors, movement of air, vibrations, among others or any combination thereof so as to create a "4-dimensional" (4D) experience to further add to the immersion. Examples of such 4D experiences are described in US Published Application 20170340982, US Published Application 20200246718, U.S. Pat. Nos. 9,830,949, 9,442,361, US Published Application 20170209804, U.S. patent Ser. No. 10/226,125, and US Published Application 20180098635, each of which is incorporated herein by reference in its entirety for all purposes.

Identify Fusion Points for the User's 3D Model

In some embodiments, the imagery 116 of each scene 112 may include any number of fusion points, from zero to tens, hundreds or thousands of fusion points. In some embodiments, the fusion point selection engine 132 may map 3D models 124 of the user 102 to one or more of the fusion points within the imagery 116 so as to select fusion points at which to fuse a particular 3D model 124 of a particular user 102.

Based on the number of fusion points in the imagery 116, the fusion point selection engine 132 may determine a number of instances or copies of the 3D models 124 of the user 102 for fusion into the A/V content 110. Because the user 102 is viewing the recorded or live-streamed event 20 on a personal device rather than at the live event (e.g., at a public event), the fusion point selection engine 132 may omit selecting 3D models 124 and default to fusing the 3D model 124 of the user 102 into all scenes 112 at one or more selected fusion points in the imagery 116.

In some embodiments, each scene 112 may have one or more fusion points. Thus, in some embodiments, the fusion point selection engine 132 may select fusion points and map the 3D model 124 to selected fusion points. In some embodiments, the fusion points may be uniquely identifiable points in time and in image coordinates of a respective image of the imagery 116. Accordingly, the 3D model 124 can be mapped to a unique fusion.

Positioning and Orienting the 3D Model at the Selected Fusion Points

The content fusion engine 130 may include the positioning/orientation engine 134 to position and orient the 3D model 124 relative to a particular fusion point. Hence, the positioning/orientation engine 134 manages a coordinate system (such as a 3-axis coordinate system, including cartesian coordinates, polar coordinates, spherical coordinates, or other coordinate system or any combination thereof) of the scene 112 (including a reference orientation and/or an orientation towards one or more particular key-points or objects). Thus the positioning/orientation engine 134 monitors and stores the position and orientation of the 3D model 124 relative to the setting of the scene 112, e.g., as detailed above.

Applying Image Filters and/or Dynamic Effects

In some embodiments, the content fusion engine 130 may include the filter(s) 136 that are configured to modify the 3D model 124 to match style and coloring of the scene 112, e.g., as detailed above. Similarly, the content fusion engine 130 may include the dynamic effects engine 138 that is configured to modify the 3D model 124 to match conditions and actions in the setting of the scene 112, e.g., as detailed above.

Storing, Access and/or View the Recorded Event

In some embodiments, the resulting fused immersive content 140 may be output to an immersive content recording engine 170. The immersive content recording engine 170 may record the fused immersive content 140 in an immersive content recording host 180. In some embodiments, the immersive content recording engine 170 may store the fused immersive content 140 via one or more storage techniques. For example, the immersive content recording engine 170 may include a rendering engine to render the fused immersive content 140 and store the rendered fused immersive content 140 in the immersive content recording host 180.

In some embodiments, the immersive content recording engine 170 may identify the data associated with the 3D model 124 and the selected fusion points, positioning/orientation, filtering and/or dynamic effects. The 3D model 124 and the selected fusion points, positioning/orientation, filtering and/or dynamic effects may be stored as one or more objects and/or files separately from the A/V content 110. Thus, while all data for fusing the 3D model 124 into the A/V content 110 are stored in the immersive content recording host 180, the 3D model 124 may be separated from the A/V content 110 so that the A/V content 110 need not be stored multiple times, e.g., where the immersive content recording host 180 is a server, cloud platform, or other remote, shared storage infrastructure, thus reducing storage resource use.

Indeed, in some embodiments, the 3D model 124, the data for fusing the 3D model 124 into the A/V content 110, and the A/V content 110 may be stored across different data storage solutions of the immersive content recording host 180. For example, the 3D model 124 may be stored on a blockchain with a reference to the A/V content 110 and the data for fusing the 3D model 124 into the A/V content 110. As a result, the A/V content 110 and the data for fusing the 3D model 124 into the A/V content 110 may only be accessible via reference from the blockchain when the user 102 has a 3D model 124 on the blockchain that references the A/V content 110 and the data for fusing the 3D model 124 into the A/V content 110. Accordingly, the blockchain may be employed to protect digital rights to the recorded event 20 by the creator(s) such as the performer of a concert or production company of a theater production, etc. Alternatively or additionally, the user's 102 indicia may be stored on the blockchain with reference to the 3D model 124, the A/V content 110 and the data for fusing the 3D model 124 into the A/V content 110 so as to make the blockchain more efficient. Alternatively or additionally, the 3D model 124, the A/V content 110 and/or the data for fusing the 3D model 124 into the A/V content 110 may all or in some combination be stored on the blockchain for improved security.

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the data storage solution may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

Herein, the term "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

In some embodiments, the data storage solution may include one or more remote storage solutions such as a cloud platform, server, or other remote solution. As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, "cloud," "Internet cloud," "cloud computing," "cloud architecture," and similar terms may include at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the immersive content recording host 180 may be written to and/or read from using one or more computer interfaces including software and/or hardware interfaces, e.g., using the indicia associated with the user's 102 ticket as a search, API and/or query parameter.

In some embodiments, one or more interfaces may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, one or more interfaces may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

In some embodiments, the immersive content recording engine 170 may communicate with the immersive content recoding host 180 via one or more networks. In some embodiments, the network may include any suitable computer network, including, two or more computers that are connected with one another for the purpose of communicating data electronically. In some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the fused immersive content 140 produced by fusing the 3D models 124 into the A/V content 110 may be output to one or more display devices 260 via a rendering engine of the immersive content recording engine 170 or other rendering engine accessing the fused immersive content 140 in the immersive content recording host 180. In some embodiments, the rendering engine may include a rendering engine configured to output 2D and/or 3D imagery using 3D models. For example, the rendering engine 150 may include one or more rendering software engines such as a gaming engine including Unity™, Unreal Engine™, or other 3D rendering engine or any combination thereof.

In some embodiments, the rendering engine may use the 3D model 124 and 3D features of the imagery 116 to output 2D and/or 3D imagery that the display device(s) 260. In some embodiments, the rending engine may create the 2D and/or 3D imagery using, e.g., rasterization, ray casting, ray tracing, path tracing, radiosity, among others or any combination thereof. As a result of one or more of the rendering techniques, the rendering engine may apply to the fused immersive content 140 shading, texture-mapping, bump-mapping, fogging/participating medium, shadows, soft shadows, reflection, transparency or opacity, translucency, refraction, diffraction, indirect illumination, caustics, depth of field, motion blur, among others or any combination thereof.

In some embodiments, as a result, the rendering engine and/or the immersive content recording host 180 (e.g., upon query by the display device(s) 260) may output to the display device(s) 260 of the recorded event 20. In some embodiments, the display device(s) 260 may include one or more flat displays (e.g., TVs, monitors, etc.), 3D capable screens (e.g., 3D TVs, etc.), holograms, VR headsets, smartphones, or other display devices and/or computing devices. In some embodiments, the rendering engine may output the fused immersive content 140 to the display device(s) 260 using a web application, webpage, native application installed on the display device(s) 260, mirrored feed, local storage/caching and playback, among other playback techniques or any combination thereof.

Publishing of the Content

In some embodiments, the fused immersive content 140 may be published from the immersive content recording engine 170 and/or immersive content recording host 180 to one or more VR applications on one or more VR platforms. Such VR platforms may include, e.g., Meta Quest™, Steam VR™, HTC Vive™, Apple visionOS™, among others or any combination thereof.

In some embodiments, the fused immersive content 140 may be published from the immersive content recording engine 170 and/or immersive content recording host 180 to one or more other platforms, such as one or more social media platforms, including, e.g., Instagram, Facebook, X, YouTube, Tik Tok, among others or any combination thereof. In some embodiments, whether the immersive content recording host 180 enables the user 102 to obtain a clip and/or image may depend on user 102 and/or creator permissioning (where the creator refers to a person having authority over the rights in the recorded event 20). In some embodiments, the user 102 may allow or disallow (e.g., via selection in the software application) to share a clip and/or image with their 3D model 124 fused. In some embodiments, the creator may configure the immersive content recording host 180 to allow or deny a user to share a clip and/or image from the recorded event 20, with or without the user's 102 3D model 124 fused therein.

In some embodiments, the ability to share any portion of the recorded event 20, whether including a user's 102 3D model 124 or not, may be determined using digital rights management (DRM) controls such a license or content key. For example, a license and/or content key request and/or provisioning process consistent with aspects of the disclosed embodiments may result in a DRM license and/or a content key, ck, being communicated to an authorized device that has requested and/or otherwise wishes to access, use, and/or render the fused immersive content 140. In certain embodiments, the content key may be included in the DRM license and communicated with the license and/or may be communicated separately from the DRM license.

In some embodiments, the display device 260 may provide a DRM service with a content request message. The content request message may comprise information identifying protected content that the display device 260 would like to access, use, and/or otherwise render (e.g., the fused immersive content 140), information relating to a type of requested content access, and/or the like. In some embodiments, the content request message may be associated with the fused immersive content 140 that the display device 260 has or will downloaded and/or otherwise stored and would like to access, use, and/or render. In further embodiments, the content request message may be associated with content that the display device 260 would like to download and/or otherwise store for later use. In yet further embodiments, the content request message may be associated with content that the user would like to stream from a service (e.g., the immersive content recording host 180 and/or another associated service provider).

The immersive content recording host 180 may provide a DRM service with a content key, ck, associated with the fused immersive content 140 identified in the content request message and/or associated constraints. In some embodiments, the content key and/or associated constraints may be protected during transmission between the immersive content recording host 180 and/or the DRM service (e.g., using suitable cryptographic encryption and/or other secure communication techniques). In certain embodiments, the constraints may articulate one or more requirements and/or parameters that the DRM service may use in connection with license generation processes.

The DRM service may generate a token based, at least in part, on the content key and the constraints received from the immersive content recording host 180. In some embodiments, the token may comprise the content key provided by the immersive content recording host 180, ck, encrypted with a symmetric key of the DRM service, ke. The token may be communicated from the DRM service to the immersive content recording host 180.

In response to the content request message, the immersive content recording host 180 may return to the display device 260 a message that includes the token provided by the DRM service and/or information that identifies (e.g., uniquely identifies) the associated fused immersive content 140.

The display device 260 may be associated with a public key secret-key pair, pica, ski. To obtain a license and/or associated content keys, ck, from the DRM service, the display device 260 may communicate a license request message to the DRM service. The license request message may comprise the information identifying the associated content, the token included in the message received from the immersive content recording host 180, and/or the public key, pica, of the display device 260.

The DRM service may determine whether the display device 260 is authorized to access, use, and/or otherwise render the protected fused immersive content 140 associated with the license request message. If the display device 260 is authorized, the DRM service may issue a license to the display device 260. In certain embodiments, the license may comprise an encrypted copy of the content key, ck. For example, the license may comprise the content key, ck, encrypted with the public key, pica, of the display device 260. The license may further comprise various license terms and/or other associated license information that may be enforced by the display device 260 in connection with the accessing, use, and/or rendering of the protected fused immersive content 140. In certain embodiments, the encrypted content key may be communicated separately from other license information included in the license.

In some embodiments, the above detailed process may be performed for each user 102 accessing the recorded event 20, which may occur concurrently (e.g., during a live streamed playback of the A/V content 110) or on-demand by each accessing user. In some embodiments, the content fusion engine 130 may be instantiated in multiple instantiations, e.g., using containers, virtual machines, or other instantiation technique or any combination thereof. Accordingly, the fusion of 3D models 124 with the A/V content 110 can be parallelized. In some embodiments, the fusion process may be performed prior to the recorded event 20 with pre-recorded A/V content 110 to be synchronized with a performance of the recorded event 20 so as to incorporate the users 102 into the performance.

In some embodiments, the recorded event 20 may be a recording of the recorded event 20 detailed above. As such, the user may use the indicia as a reference to access the recording of the recorded event 20. In some embodiments, the recording may include the same or different fusion points as the recorded event 20, but without any other users. Thus, the fusion point selection engine 132 may select one or more fusion points in each scene 112 in which to insert the 3D model 124 of the user 102.

In some embodiments, as detailed above, the immersive content recording host 180 may be an external storage drive (solid state drive, hard drive, flash drive, etc.). Accordingly, the indicia may be used to authenticate the user 102 to be provided the recorded event 20, e.g., on the external storage drive. In some embodiments, as detailed above, the immersive content recording host 180 may be a remote storage solutions, such as a CDN, a blockchain, a server, a cloud platform, or a CDN, a server, a cloud platform accessed via a reference on a blockchain. For a remote storage solution, the user may query the immersive content recording host 180 using the indicia to retrieve the 3D model 124. The 3D model 124 may then be fused into the recorded event 20 in real-time or in advance for user 102 view via a suitable display device 260 as detailed above in a pre-recorded fashion. In some embodiments, the 3D model 124 may be pre-fused into the recorded event 20 prior to user 102 querying the immersive content recording.

In some embodiments, the user 102 may share the fused immersive content 140 of the recorded event 20 using a barcode, QR, hyperlink, software application (e.g., the software application detailed above) or by any other mechanism or any combination thereof. Thus, the user 102 may share one time, limited use, or permanent permission to access, view and/or download the fused immersive content 140 with others. In some embodiments, the ability and extent to which the user 102 may share the fused immersive content 140 may be enabled and/or disabled by the creator as a setting of the immersive content recording host 180. Thus, a creator may enable the user 102 to share with one or more others the fused immersive content 140 for viewing the fused immersive content 140 together in a view session (such as in a watch-party style viewing or streaming), but disable the others from downloading or later accessing the fused immersive content 140.

Example Embodiment

One or more illustrative examples of aspects of the present disclosure may include an virtual and/or augmented reality (AR/VR) implementation of the live and/or recorded events detailed above. The illustrative example detailed below is illustrative and non-limiting.

According to aspects of the present disclosure, a performer, such as a singer or band, may schedule a live event (e.g., live event 10) for a concert hosted at a venue. To attend the live event, a concert goer may purchase a ticket for the performance. The purchase may be performed through an application ("app") such as an app on the concert goer's smartphone. The app may be a third-party ticketing app such as Ticketmaster or StubHub, or may be a first party app associated with the performer. The purchase of the ticket can provide proof of purchase and authorization to enter the venue to attend the performance, and may also provide a data record for the live event that pre-stages the concert goer for virtual participation in the content of the performance via the above details fusion of a 3D model of the concert goer into the content (e.g., via the indicia detailed above). Thus, the application may provide a digital version of the ticket for the concert goer to present at the venue as proof of purchase, while also providing the indicia that can be used to link the concert goer to activities throughout the live event and after.

Thus, the concert goer may arrive at the venue and present the digital version of the ticket to enter the venue. At the entrance of the venue may be a capture device (e.g., capture device 122 as detailed above) that includes a 360 degree 3D scanner for scanning the concert goer. Scanning the concert goer can produce a 3D model of the concert goer, either a full body model or a head model or both or any other portion(s) of the concert goer. The indicia pre-staged by the app can be used to link the 3D model to the concert goer so that the use of the 3D model can be linked to the concert goer. As detailed above, while in this example the 3D model is captured via a 3D scanner, other capture devices may be employed, either in the alternative or in combination.

Upon producing the 3D model of the concert goer, the 3D model can be supplied to a back-end computing system that inserts the 3D model into the performance by integrating the 3D model into digital content that accompanies the live performance. The digital content can include 2D and/or 3D digital imagery that is presented on display device(s). The display devices can be 2D screens, such as television(s) and/or display panel(s) set up on or near a stage at the venue. Thus, the performer can sing alongside the playing of video associated with the song as an ambient or accompanying music video that is choreographed for the song.

Alternatively or in addition, the 3D displays can be used such as holograms or 3D televisions and/or 3D display panels. Indeed, the 3D displays may be AR/VR headsets that are furnished at the venue or brought in by each concert goer. In the latter case, the app may be loaded on the AR/VR headset and the digital content may be presented to the wearer during the performance based on a real-time feed of the digital content, real-time synchronization of recorded content with the performance (or any other method of synchronizing the content with the performance).

The concert goer may wear the AR/VR headset, and via a software application, digital platform, or other content delivery technique, may view the performance in the AR/VR headset. The AR/VR headset may be equipped with head-tracking such that where the concert goer move their head, the image rendered in the AR/VR headset may render imagery associated with direction in which the concert goer is looking, such as rendering an image of the performer while the concert goer is looking towards the stage. Moreover, the AR/VR headset may deliver the content associated with the performance, e.g., in virtual representations of display device, as part of the AR/VR environment rendered in the headset (e.g., instead of seeing the venue itself, seeing the content as, e.g., a background, objects alongside the performer or located throughout the venue, etc.). To facilitate rendering an environment or background of the content in place of or within the venue, the venue may be furnished with one or more "green screens" (which may be green, blue, or any other color suitable for superimposing imagery) to create separation between the background or features of the venue from the performance.

The AR/VR headset may capture images of the venue via externally oriented cameras and, in real-time, perform video passthrough to one or more displays within the AR/VR headset. During or after passthrough, the AR/VR headset may modify the video of the images of the venue with the content synchronized to the performance. For example, the AR/VR headset may include an Apple Vision Pro™, Meta Quest 3™, or other AR/VR headset equipped with real-time passthrough or any combination thereof. Accordingly, the AR/VR headset may make the need for display devices in the venue unnecessary, adding to increased immersiveness. Similar functionality may be achieved with a mobile computing, such as smartphone or tablet whereby the real-time video passthrough is passed from a rear-facing camera to the display of the mobile computing device to render imagery of the venue and/or content associated with a location towards which the rear-facing camera is pointed.

Alternatively, or in addition, the AR/VR headset may be equipped with transparent visor on which imagery can be displayed to give the appearance of the images existing in the physical world. In such an AR/VR headset, real-time passthrough may be omitted and the content accompanying the performance displayed so as to appear in the venue at a location in the direction that the content goer is looking. Examples of such AR/VR headsets may include, e.g., Microsoft Hololens™, Google Glass™, Magic Leap 1 and/or 2, among others or any combination thereof.

The display device(s), whether televisions, display panels, hologram projectors, mobile computing devices, and/or AR/VR headsets, may render the imagery of the content associated with the performance in synchronization with the performance and fused with the 3D model of one or more concert goers and/or the performer. Accordingly, the content fusion engine 130 may operate to select 3D models of concert goers, e.g., by selection of the indicia, and integrate the selected 3D models with the imagery. As a result, when a concert goer views, e.g., the display of the AR/VR headset, the concert goer sees the live video passthrough of the performer on the stage while also seeing the imagery of the content to create an immersive mixed reality performance. Moreover, the imagery may include, at one or more points in the imagery, the concert goer's likeness via the 3D model as a part of the imagery, thus make the concert goer's likeness a part of the performance.

At the end of the performance, the concert goer may pick up a copy of a recording of the performance and the content, e.g., on an external solid state drive (SSD), flash drive, thumb drive, or other storage device. Alternatively or in addition, the concert goer may access, e.g., via the app using their indicia or digital ticket, the recording hosted on a content platform.

Upon accessing the recording, whether on the content platform or on the storage device, the concert goer may view the recording in an AR/VR headset. However, unlike in the live event, the recording may have other concert goers removed from the content so only the particular concert goer accessing the recording appears in the content. Thus, while the concert goer may see an environment similar to what they saw or would see at the live event, the recording is digital without the live passthrough of the performance and without other concert goers.

Additionally, in either or both of the live or recorded performance, the concert goer may be inserted at different points in the content and may even be inserted as a person associated with the performance, such as a member of a band, orchestra, back-up singer, back-up dancer, or even the performer to replace the performer's likeness with the particular concert goer's. Where the concert goer can be inserted as a member of a band, orchestra, back-up singer, back-up dancer, or even the performer, the software application can allow the concert goer to select which person to be inserted as. The concert goer may be permissioned to select one or more of the members of the band, orchestra, back-up singer, back-up dancer, or performer. Although, the performer or other authority may set permissions that restrict which person(s) for which the concert goer may be inserted.

FIG. 3 depicts a block diagram of an exemplary computer-based system and platform 300 in accordance with one or more embodiments of the present disclosure. However, not all of these components may be required to practice one or more embodiments, and variations in the arrangement and type of the components may be made without departing from the spirit or scope of various embodiments of the present disclosure.

In some embodiments, the illustrative computing devices and the illustrative computing components of the exemplary computer-based system and platform 300 may be configured to manage a large number of members and concurrent transactions, as detailed herein. In some embodiments, the exemplary computer-based system and platform 300 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 3, client device 302, client device 303 through client device 304 (e.g., clients) of the exemplary computer-based system and platform 300 may include virtually any computing device capable of receiving and sending a message over a network (e.g., cloud network), such as network 305, to and from another computing device, such as servers 306 and 307, each other, and the like. In some embodiments, the client devices 302 through 304 may be personal computers, multiprocessor systems, microprocessor-based or programmable consumer electronics, network PCs, and the like. In some embodiments, one or more client devices within client devices 302 through 304 may include computing devices that typically connect using a wireless communications medium such as cell phones, smart phones, pagers, walkie talkies, radio frequency (RF) devices, infrared (IR) devices, €Bs citizens band radio, integrated devices combining one or more of the preceding devices, or virtually any mobile computing device, and the like. In some embodiments, one or more client devices within client devices 302 through 304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 302 through 304 may include may run one or more applications, such as Internet browsers, mobile applications, voice calls, video games, videoconferencing, and email, among others. In some embodiments, one or more client devices within client devices 302 through 304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 302 through 304 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 302 through 304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 305 may provide network access, data transport and/or other services to any computing device coupled to it. In some embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 305 may include and implement, as an alternative or in conjunction with one or more of the above, a WiMAX architecture defined by the WiMAX forum. In some embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 305 may also include mass storage, such as network attached storage (NAS), a storage area network (SAN), a content delivery network (CDN) or other forms of computer or machine readable media.

In some embodiments, the exemplary server 306 or the exemplary server 307 may be a web server (or a series of servers) running a network operating system, examples of which may include but are not limited to Apache on Linux or Microsoft IIS (Internet Information Services). In some embodiments, the exemplary server 306 or the exemplary server 307 may be used for and/or provide cloud and/or network computing. Although not shown in FIG. 3, in some embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

In some embodiments, one or more of the exemplary servers 306 and 307 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 301 through 304.

In some embodiments and, optionally, in combination of any embodiment described above or below, for example, one or more exemplary computing client devices 302 through 304, the exemplary server 306, and/or the exemplary server 307 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 4:
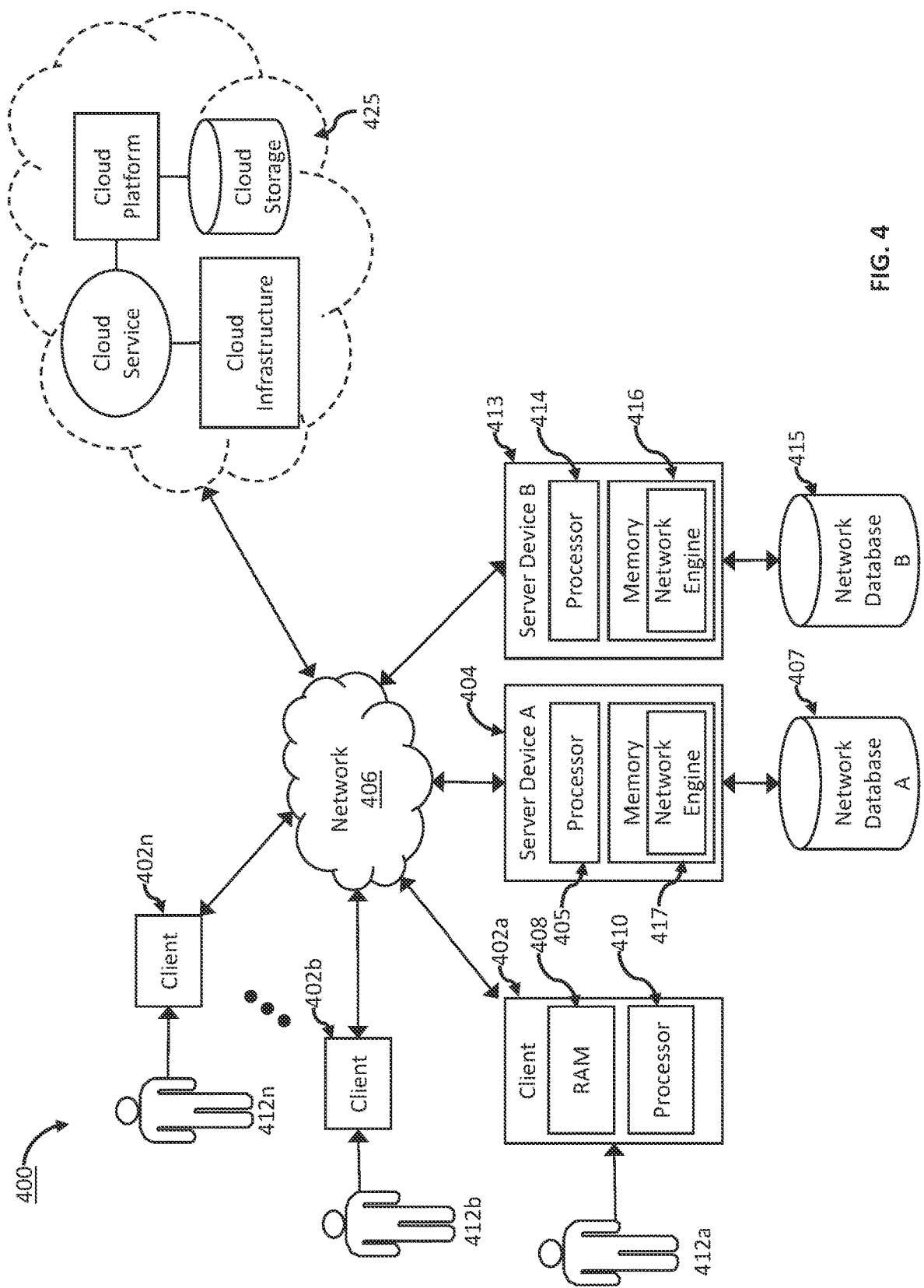
FIG. 4 depicts a block diagram of another exemplary computer-based system and platform for creating immersive experiences in accordance with one or more embodiments of the present disclosure.

FIG. 4 depicts a block diagram of another exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 402a, client device 402b through client device 402n shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client device 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 402a through 402n may also comprise a number of external or internal devices such as a mouse, a CD-ROM, DVD, a physical or virtual keyboard, a display, or other input or output devices. In some embodiments, examples of client devices 402a through 402n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, client devices 402a through 402n may be specifically programmed with one or more application programs in accordance with one or more principles/methodologies detailed herein. In some embodiments, client devices 402a through 402n may operate on any operating system capable of supporting a browser or browser-enabled application, such as Microsoft™, Windows™, and/or Linux. In some embodiments, client devices 402a through 402n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 402a through 402n, user 412a, user 412b through user 412n, may communicate over the exemplary network 406 with each other and/or with other systems and/or devices coupled to the network 406. As shown in FIG. 4, exemplary server devices 404 and 413 may include processor 405 and processor 414, respectively, as well as memory 417 and memory 416, respectively. In some embodiments, the server devices 404 and 413 may be also coupled to the network 406. In some embodiments, one or more client devices 402a through 402n may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
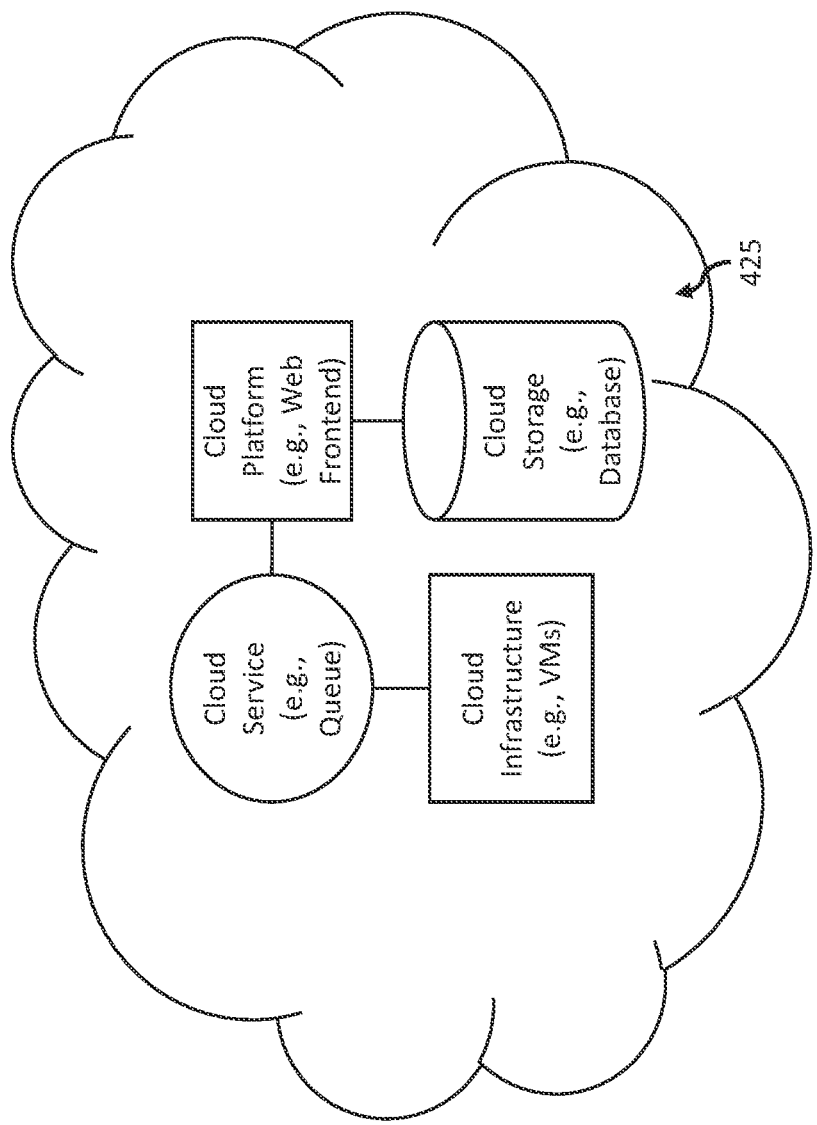
FIG. 5 depicts illustrative schematics of an exemplary implementation of the cloud computing/architecture(s) in which embodiments of a system for creating immersive experiences may be specifically configured to operate in accordance with some embodiments of the present disclosure.
Figure 6:
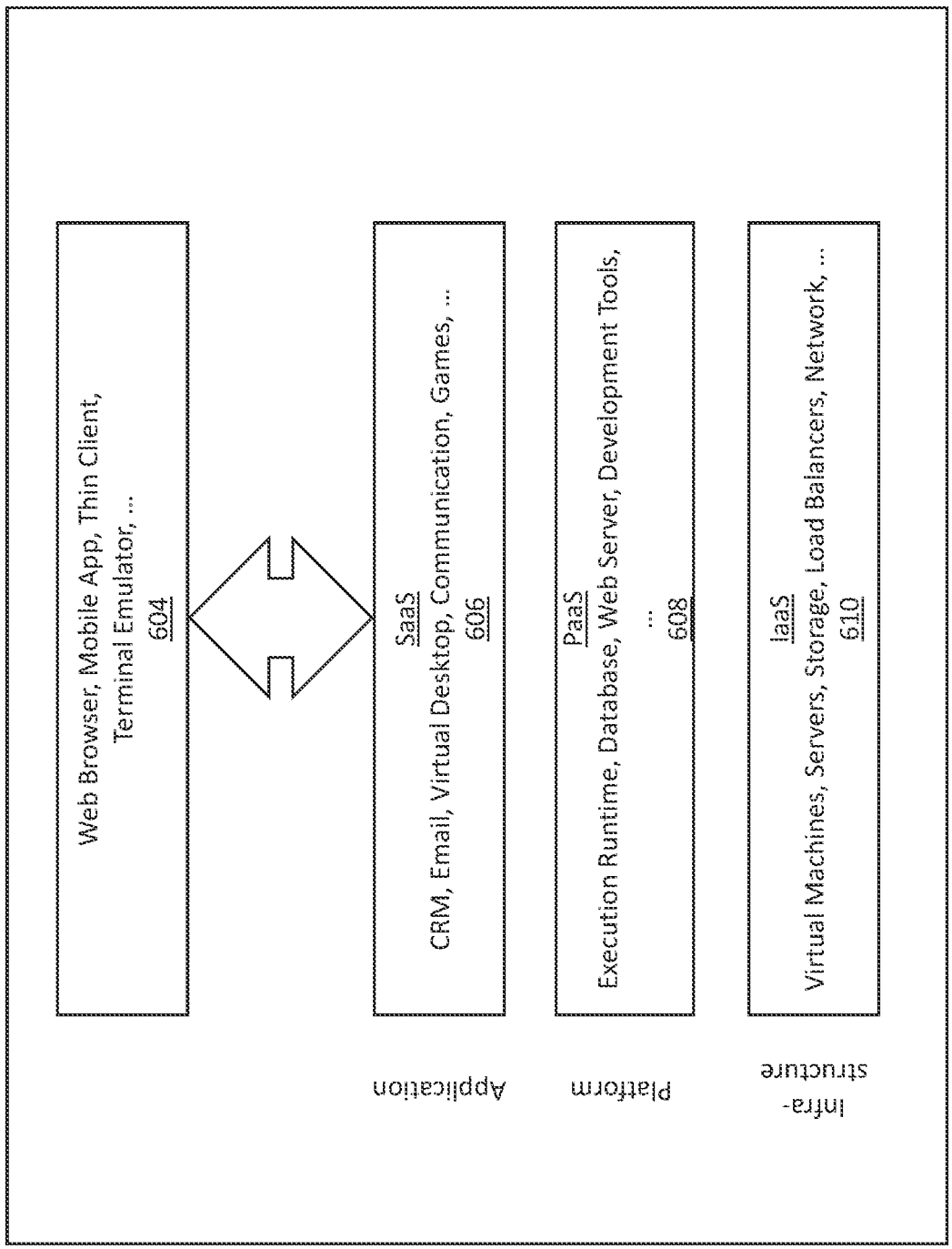
FIG. 6 depicts illustrative schematics of another exemplary implementation of the cloud computing/architecture(s) in which embodiments of a system for creating immersive experiences may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/ architecture 425 such as, but not limiting to: infrastructure a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of exemplary implementations of the cloud computing/architecture(s) in which the exemplary inventive computer-based systems/ platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, etc.). Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like.

In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: receiving, by at least one processor from a user device via a software application installed on the user device, event data associated with at least one live event associated with at least one performer; generating, by the at least one processor, an indicia associated with the event data to represent authorization of the user to access the at least one live event; receiving, by the at least one processor, at least one image of the user; inputting, by the at least one processor, the at least one image into a three-dimensional modelling engine configured to generate at least one three-dimensional model of the user based at least in part on the at least one image; linking, by the at least one processor, the at least one three-dimensional model to the indicia; accessing, by the at least one processor, visual content associated with the at least one live event, the visual content being configured to accompany at least one performance associated with the at least one live event; wherein the visual content comprises imagery, the imagery comprising a plurality of fusion points representing a plurality of candidate positions from which at least one particular position is configured to be selected for integrating the at least one three-dimensional model into the imagery; detecting, by the at least one processor via the software application, a presence of the user at the at least one live event; instructing, by the at least one processor, upon detecting the presence, the software application to control the user device to disable access by the user to at least one function of the user device during the at least one live event; determining, by the at least one processor, upon detecting the presence, at least one fusion point of the plurality of fusions in the imagery to identify the at least one particular position of the plurality of candidate positions at which to integrate the at least one three-dimensional model into the imagery; inserting, during the live event, by the at least one processor, the at least one three-dimensional model into the imagery at the at least one particular position of the at least one fusion point; determining, during the live event, by the at least one processor, at least one attribute of the at least one particular position based at least in part on fusion point data associated with the at least one fusion point; modifying, during the live event, by the at least one processor, the at least one three-dimensional model based at least in part on the at least one attribute so as to integrate the at least one three-dimensional model into the imagery; storing, by the at least one processor, at least one recording of the at least one live event in association with the indicia so as to enable the at least one user to access, using the software application, the at least one recording after the at least one live event; and wherein the software application is configured to enable the at least one user to instruct to fuse the at least one three-dimensional model of the at least one user into one or more recording imagery positions of the imagery, the one or more of recording imagery positions being one or more same or different positions relative to the at least one particular position; and wherein the software application is configured to enable the at least one user to view, via at least one display device, the at least one recording of the at least one live event having the at least one three-dimensional model integrated into the one or more recording imagery positions.

Clause 2. The method of clause 1, wherein modifying the at least one three-dimensional model comprises at least one of: positioning the at least one three-dimensional model within the imagery, orienting the at least one three-dimensional model within the imagery, altering a style or tone or both of the at least one three-dimensional model to match the imagery, or applying at least one dynamic effect to the at least one three-dimensional model to match the imagery.

Clause 3. The method of clause 1, wherein the at least one recording is provided on a portable storage device provided to the at least one user.

Clause 4. The method of clause 1, further comprising: storing, by the at least one processor, the at least one recording in at least one content delivery system; receiving, by the at least one processor, at least one access request to access the at least one recording in the at least one content delivery system, the at least one access request comprising the indicia; and communicating, by the at least one processor, the at least one recording to the user device via the software application based at least in part on the indicia.

Clause 5. The method of clause 1, wherein the at least one recording comprises an augmented reality recording of the at least one live event, the at least one augmented reality recording being configured to be played back to the at least one user via the at least one display device; and wherein the at least one display device comprises at least one headset configured for at least one of: augmented reality content, or virtual reality content.

Clause 6. The method of clause 1, further comprising: receiving, by the at least one processor via the software application, at least one selection by the at least one user to the at least one user to purchase at least one portion of the at least one recording; wherein the at least one portion comprises at least one of: at least one clip of the at least one recording, or at least one image of the at least one recording receiving, by the at least one processor, at least one subsequent image of the at least one user, wherein the at least one subsequent image comprise at least one same or different image relative to the at least one image; inputting, by the at least one processor, the at least one subsequent image into a three-dimensional modelling engine configured to generate at least one subsequent three-dimensional model of the user based at least in part on the at least one subsequent image; inserting, into the at least one portion of the at least one recording, by the at least one processor, the at least one subsequent three-dimensional model at the one or more recording imagery positions; determining, into the at least one portion of the at least one recording, by the at least one processor, at least one recording attribute of the one or more recording imagery positions based at least in part on fusion point data associated with the one or more recording imagery positions; and modifying, in the at least one portion of the at least one recording, by the at least one processor, the at least one subsequent three-dimensional model based at least in part on the at least one recording attribute so as to integrate the at least one subsequent three-dimensional model into the at least one portion.

Clause 7. The method of clause 6, wherein the software application is further configured to enable the at least one user to share the at least one portion of the at least one recording on at least one social media platform.

Clause 8. The method of clause 1, further comprising: instructing, by the at least one processor, a three-dimensional scanning device to capture the at least one image of the at least one user in response to the at least one user confirming the indicia; receiving, by the at least one processor from the three-dimensional scanning device, the at least one image of the at least one user; wherein the at least one image comprises scan data output by the three-dimensional scanning device, the scan data providing depth data so as to enable representing the at least one image in three dimensions.

Clause 9. The method of clause 1, further comprising: receiving, by the at least one processor from the user device via the software application, the at least one image of the user;

Clause 10. The method of clause 9, wherein the software application comprises a camera function configured to capture the at least one image of the user via an image sensor associated with the user device.

Clause 11. The method of clause 9, wherein the software application is configured to: access an image library and enable the user to select the at least one image to upload to the at least one processor.

Clause 12. The method of clause 11, wherein the image library is configured to enable the user to select the at least one image for fusion into a particular portion of the visual content.

Clause 13. The method of clause 1, further comprising: receiving, by at least one processor, via a capture system in response to the indicia, the at least one image of the user; wherein the capture system comprises at least one device configured to perform at least one scan to produce the at least one image comprising scan data configured to enable constructing a three-dimensional model.

Clause 14. The method of clause 1, wherein the at least one function comprises at least one of: a camera application of the user device, or at least one social media application.

Clause 15. A system comprising: at least one processor in communication with at least one non-transitory computer readable medium having software instructions stored thereon, wherein the at least one processor, upon execution of the software instructions, is configured to perform steps to: receiving, by at least one processor from a user device via a software application installed on the user device, event data associated with at least one live event associated with at least one performer; generate an indicia associated with the event data to represent authorization of the user to access the at least one live event; receive at least one image of the user; input the at least one image into a three-dimensional modelling engine configured to generate at least one three-dimensional model of the user based at least in part on the at least one image; link the at least one three-dimensional model to the indicia; access visual content associated with the at least one live event, the visual content being configured to accompany at least one performance associated with the at least one live event; wherein the visual content comprises imagery, the imagery comprising a plurality of fusion points representing a plurality of candidate positions from which at least one particular position is configured to be selected for integrating the at least one three-dimensional model into the imagery; detecting, by the at least one processor via the software application, a presence of the user at the at least one live event; instruct upon detecting the presence, the software application to control the user device to disable access by the user to at least one function of the user device during the at least one live event; determine upon detecting the presence, at least one fusion point of the plurality of fusions in the imagery to identify the at least one particular position of the plurality of candidate positions at which to integrate the at least one three-dimensional model into the imagery; inserting, during the live event, by the at least one processor, the at least one three-dimensional model into the imagery at the at least one particular position of the at least one fusion point; determining, during the live event, by the at least one processor, at least one attribute of the at least one particular position based at least in part on fusion point data associated with the at least one fusion point; modifying, during the live event, by the at least one processor, the at least one three-dimensional model based at least in part on the at least one attribute so as to integrate the at least one three-dimensional model into the imagery; store at least one recording of the at least one live event in association with the indicia so as to enable the at least one user to access, using the software application, the at least one recording after the at least one live event; and wherein the software application is configured to enable the at least one user to instruct to fuse the at least one three-dimensional model of the at least one user into one or more recording imagery positions of the imagery, the one or more of recording imagery positions being one or more same or different positions relative to the at least one particular position; and wherein the software application is configured to enable the at least one user to view, via at least one display device, the at least one recording of the at least one live event having the at least one three-dimensional model integrated into the one or more recording imagery positions.

Clause 16. The system of clause 15, wherein modifying the at least one three-dimensional model comprises at least one of: positioning the at least one three-dimensional model within the imagery, orienting the at least one three-dimensional model within the imagery, altering a style or tone or both of the at least one three-dimensional model to match the imagery, or applying at least one dynamic effect to the at least one three-dimensional model to match the imagery.

Clause 17. The system of clause 15, wherein the at least one recording is provided on a portable storage device provided to the at least one user.

Clause 18. the system of clause 15, wherein the at least one processor, upon execution of the software instructions, is further configured perform steps to: store the at least one recording in at least one content delivery system; receive at least one access request to access the at least one recording in the at least one content delivery system, the at least one access request comprising the indicia; and communicate the at least one recording to the user device via the software application based at least in part on the indicia.

Clause 19. The system of clause 15, wherein the at least one recording comprises an augmented reality recording of the at least one live event, the at least one augmented reality recording being configured to be played back to the at least one user via the at least one display device; and wherein the at least one display device comprises at least one headset configured for at least one of: augmented reality content, or virtual reality content.

Clause 20. The system of clause 15, wherein the at least one processor, upon execution of the software instructions, is further configured perform steps to: receiving, by the at least one processor via the software application, at least one selection by the at least one user to the at least one user to purchase at least one portion of the at least one recording; wherein the at least one portion comprises at least one of: at least one clip of the at least one recording, or at least one image of the at least one recording receive at least one subsequent image of the at least one user, wherein the at least one subsequent image comprise at least one same or different image relative to the at least one image; input the at least one subsequent image into a three-dimensional modelling engine configured to generate at least one subsequent three-dimensional model of the user based at least in part on the at least one subsequent image; insert, into the at least one portion of the at least one recording, the at least one subsequent three-dimensional model at the one or more recording imagery positions; determine, into the at least one portion of the at least one recording, at least one recording attribute of the one or more recording imagery positions based at least in part on fusion point data associated with the one or more recording imagery positions; and modify, in the at least one portion of the at least one recording, the at least one subsequent three-dimensional model based at least in part on the at least one recording attribute so as to integrate the at least one subsequent three-dimensional model into the at least one portion.

Clause 21. The system of clause 20, wherein the software application is further configured to enable the at least one user to share the at least one portion of the at least one recording on at least one social media platform.

Clause 22. The system of clause 15, wherein the at least one processor, upon execution of the software instructions, is further configured perform steps to: instruct a three-dimensional scanning device to capture the at least one image of the at least one user in response to the at least one user confirming the indicia; receiving, by the at least one processor from the three-dimensional scanning device, the at least one image of the at least one user; wherein the at least one image comprises scan data output by the three-dimensional scanning device, the scan data providing depth data so as to enable representing the at least one image in three dimensions.

Clause 23. The system of clause 15, wherein the at least one processor, upon execution of the software instructions, is further configured perform steps to: receiving, by the at least one processor from the user device via the software application, the at least one image of the user;

Clause 24. The system of clause 23, wherein the software application comprises a camera function configured to capture the at least one image of the user via an image sensor associated with the user device.

Clause 25. The system of clause 23, wherein the software application is configured to: access an image library and enable the user to select the at least one image to upload to the at least one processor.

Clause 26. The system of clause 25, wherein the image library is configured to enable the user to select the at least one image for fusion into a particular portion of the visual content.

Clause 27. The system of clause 15, wherein the at least one processor, upon execution of the software instructions, is further configured perform steps to: receiving, by at least one processor, via a capture system in response to the indicia, the at least one image of the user; wherein the capture system comprises at least one device configured to perform at least one scan to produce the at least one image comprising scan data configured to enable constructing a three-dimensional model.

Clause 28. The system of clause 15, wherein the at least one function comprises at least one of: a camera application of the user device, or at least one social media application.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor from a user device via a software application installed on the user device, event data associated with at least one live event associated with at least one performer;
generating, by the at least one processor, an indicia associated with the event data to represent authorization of a user to access the at least one live event;
receiving, by the at least one processor, at least one image of the user;
inputting, by the at least one processor, the at least one image into a three-dimensional modelling engine configured to generate at least one three-dimensional model of the user based at least in part on the at least one image;
linking, by the at least one processor, the at least one three-dimensional model to the indicia;
accessing, by the at least one processor, visual content associated with the at least one live event, the visual content being configured to accompany at least one performance associated with the at least one live event;
wherein the visual content comprises imagery, the imagery comprising a plurality of fusion points representing a plurality of candidate positions from which at least one particular position is configured to be selected for integrating the at least one three-dimensional model into the imagery;
detecting, by the at least one processor via the software application, a presence of the user at the at least one live event;
instructing, by the at least one processor, upon detecting the presence, the software application to control the user device to disable access by the user to at least one function of the user device during the at least one live event;
determining, by the at least one processor, upon detecting the presence, at least one fusion point of the plurality of fusion points in the imagery to identify the at least one particular position of the plurality of candidate positions at which to integrate the at least one three-dimensional model into the imagery;
inserting, during the live event, by the at least one processor, the at least one three-dimensional model into the imagery at the at least one particular position of the at least one fusion point;
determining, during the live event, by the at least one processor, at least one attribute of the at least one particular position based at least in part on fusion point data associated with the at least one fusion point;
modifying, during the live event, by the at least one processor, the at least one three-dimensional model based at least in part on the at least one attribute so as to integrate the at least one three-dimensional model into the imagery;
storing, by the at least one processor, at least one recording of the at least one live event in association with the indicia so as to enable at least one user to access, using the software application, the at least one recording after the at least one live event; and
wherein the software application is configured to enable the at least one user to instruct to fuse the at least one three-dimensional model of the at least one user into one or more recording imagery positions of the imagery, the one or more recording imagery positions being one or more same or different positions relative to the at least one particular position; and
wherein the software application is configured to enable the at least one user to view, via at least one display device, the at least one recording of the at least one live event having the at least one three-dimensional model integrated into the one or more recording imagery positions.

2. The method of claim 1, wherein modifying the at least one three-dimensional model comprises at least one of:
positioning the at least one three-dimensional model within the imagery,
orienting the at least one three-dimensional model within the imagery,
altering a style or tone or both of the at least one three-dimensional model to match the imagery, or
applying at least one dynamic effect to the at least one three-dimensional model to match the imagery.

3. The method of claim 1, wherein the at least one recording is provided on a portable storage device provided to the at least one user.

4. The method of claim 1, further comprising:
storing, by the at least one processor, the at least one recording in at least one content delivery system;
receiving, by the at least one processor, at least one access request to access the at least one recording in the at least one content delivery system, the at least one access request comprising the indicia; and
communicating, by the at least one processor, the at least one recording to the user device via the software application based at least in part on the indicia.

5. The method of claim 1, wherein the at least one recording comprises an augmented reality recording of the at least one live event, the at least one augmented reality recording being configured to be played back to the at least one user via the at least one display device; and
wherein the at least one display device comprises at least one headset configured for at least one of:
augmented reality content, or
virtual reality content.

6. The method of claim 1, further comprising:
receiving, by the at least one processor via the software application, at least one selection by the at least one user to the at least one user to purchase at least one portion of the at least one recording;
wherein the at least one portion comprises at least one of:
at least one clip of the at least one recording, or
at least one image of the at least one recording;
receiving, by the at least one processor, at least one subsequent image of the at least one user, wherein the at least one subsequent image comprise at least one same or different image relative to the at least one image;
inputting, by the at least one processor, the at least one subsequent image into a three-dimensional modelling engine configured to generate at least one subsequent three-dimensional model of the user based at least in part on the at least one subsequent image;
inserting, into the at least one portion of the at least one recording, by the at least one processor, the at least one subsequent three-dimensional model at the one or more recording imagery positions;
determining, into the at least one portion of the at least one recording, by the at least one processor, at least one recording attribute of the one or more recording imagery positions based at least in part on fusion point data associated with the one or more recording imagery positions; and modifying, in the at least one portion of the at least one recording, by the at least one processor, the at least one subsequent three-dimensional model based at least in part on the at least one recording attribute so as to integrate the at least one subsequent three-dimensional model into the at least one portion.

7. The method of claim 6, wherein the software application is further configured to enable the at least one user to share the at least one portion of the at least one recording on at least one social media platform.

8. The method of claim 1, further comprising:
instructing, by the at least one processor, a three-dimensional scanning device to capture the at least one image of the at least one user in response to the at least one user confirming the indicia;
receiving, by the at least one processor from the three-dimensional scanning device, the at least one image of the at least one user;
wherein the at least one image comprises scan data output by the three-dimensional scanning device, the scan data providing depth data so as to enable representing the at least one image in three dimensions.

9. The method of claim 1, further comprising:
receiving, by the at least one processor from the user device via the software application, the at least one image of the user.

10. The method of claim 9, wherein the software application comprises a camera function configured to capture the at least one image of the user via an image sensor associated with the user device.

11. The method of claim 9, wherein the software application is configured to:
access an image library and
enable the user to select the at least one image to upload to the at least one processor.

12. The method of claim 11, wherein the image library is configured to enable the user to select the at least one image for fusion into a particular portion of the visual content.

13. The method of claim 1, further comprising:
receiving, by at least one processor, via a capture system in response to the indicia, the at least one image of the user;
wherein the capture system comprises at least one device configured to perform at least one scan to produce the at least one image comprising scan data configured to enable constructing a three-dimensional model.

14. The method of claim 1, wherein the at least one function comprises at least one of:
a camera application of the user device, or
at least one social media application.

15. A system comprising:
at least one processor in communication with at least one non-transitory computer readable medium having software instructions stored thereon, wherein the at least one processor, upon execution of the software instructions, is configured to perform steps to:
receive, from a user device via a software application installed on the user device, event data associated with at least one live event associated with at least one performer;
generate an indicia associated with the event data to represent authorization of a user to access the at least one live event;
receive at least one image of the user;
input the at least one image into a three-dimensional modelling engine configured to generate at least one three-dimensional model of the user based at least in part on the at least one image;
link the at least one three-dimensional model to the indicia;
access visual content associated with the at least one live event, the visual content being configured to accompany at least one performance associated with the at least one live event;
wherein the visual content comprises imagery, the imagery comprising a plurality of fusion points representing a plurality of candidate positions from which at least one particular position is configured to be selected for integrating the at least one three-dimensional model into the imagery;
detect, via the software application, a presence of the user at the at least one live event;
instruct upon detecting the presence, the software application to control the user device to disable access by the user to at least one function of the user device during the at least one live event;
determine upon detecting the presence, at least one fusion point of the plurality of fusion points in the imagery to identify the at least one particular position of the plurality of candidate positions at which to integrate the at least one three-dimensional model into the imagery;
insert, during the live event, the at least one three-dimensional model into the imagery at the at least one particular position of the at least one fusion point;
determine, during the live event, at least one attribute of the at least one particular position based at least in part on fusion point data associated with the at least one fusion point;
modify, during the live event, the at least one three-dimensional model based at least in part on the at least one attribute so as to integrate the at least one three-dimensional model into the imagery;
store at least one recording of the at least one live event in association with the indicia so as to enable at least one user to access, using the software application, the at least one recording after the at least one live event; and
wherein the software application is configured to enable the at least one user to instruct to fuse the at least one three-dimensional model of the at least one user into one or more recording imagery positions of the imagery, the one or more recording imagery positions being one or more same or different positions relative to the at least one particular position; and
wherein the software application is configured to enable the at least one user to view, via at least one display device, the at least one recording of the at least one live event having the at least one three-dimensional model integrated into the one or more recording imagery positions.

16. The system of claim 15, wherein modifying the at least one three-dimensional model comprises at least one of:
positioning the at least one three-dimensional model within the imagery,
orienting the at least one three-dimensional model within the imagery, altering a style or tone or both of the at least one three-dimensional model to match the imagery, or applying at least one dynamic effect to the at least one three-dimensional model to match the imagery.

17. The system of claim 15, wherein the at least one recording is provided on a portable storage device provided to the at least one user.

18. The system of claim 15, wherein the at least one processor, upon execution of the software instructions, is further configured perform steps to:

store the at least one recording in at least one content delivery system;

receive at least one access request to access the at least one recording in the at least one content delivery system, the at least one access request comprising the indicia; and communicate the at least one recording to the user device via the software application based at least in part on the indicia.

19. The system of claim 15, wherein the at least one recording comprises an augmented reality recording of the at least one live event, the at least one augmented reality recording being configured to be played back to the at least one user via the at least one display device; and wherein the at least one display device comprises at least one headset configured for at least one of:
augmented reality content, or
virtual reality content.

20. The system of claim 15, wherein the at least one processor, upon execution of the software instructions, is further configured perform steps to:

receive, via the software application, at least one selection by the at least one user to the at least one user to purchase at least one portion of the at least one recording;

wherein the at least one portion comprises at least one of:
at least one clip of the at least one recording, or
at least one image of the at least one recording;

receive at least one subsequent image of the at least one user, wherein the at least one subsequent image comprise at least one same or different image relative to the at least one image;

input the at least one subsequent image into a three-dimensional modelling engine configured to generate at least one subsequent three-dimensional model of the user based at least in part on the at least one subsequent image;

insert, into the at least one portion of the at least one recording, the at least one subsequent three-dimensional model at the one or more recording imagery positions;

determine, into the at least one portion of the at least one recording, at least one recording attribute of the one or more recording imagery positions based at least in part on fusion point data associated with the one or more recording imagery positions; and modify, in the at least one portion of the at least one recording, the at least one subsequent three-dimensional model based at least in part on the at least one recording attribute so as to integrate the at least one subsequent three-dimensional model into the at least one portion.

21. The system of claim 20, wherein the software application is further configured to enable the at least one user to share the at least one portion of the at least one recording on at least one social media platform.

22. The system of claim 15, wherein the at least one processor, upon execution of the software instructions, is further configured perform steps to:

instruct a three-dimensional scanning device to capture the at least one image of the at least one user in response to the at least one user confirming the indicia;

receive, from the three-dimensional scanning device, the at least one image of the at least one user;

wherein the at least one image comprises scan data output by the three-dimensional scanning device, the scan data providing depth data so as to enable representing the at least one image in three dimensions.

23. The system of claim 15, wherein the at least one processor, upon execution of the software instructions, is further configured perform steps to:

receive, from the user device via the software application, the at least one image of the user.

24. The system of claim 23, wherein the software application comprises a camera function configured to capture the at least one image of the user via an image sensor associated with the user device.

25. The system of claim 23, wherein the software application is configured to:

access an image library and enable the user to select the at least one image to upload to the at least one processor.

26. The system of claim 25, wherein the image library is configured to enable the user to select the at least one image for fusion into a particular portion of the visual content.

27. The system of claim 15, wherein the at least one processor, upon execution of the software instructions, is further configured perform steps to:

receive, via a capture system in response to the indicia, the at least one image of the user;

wherein the capture system comprises at least one device configured to perform at least one scan to produce the at least one image comprising scan data configured to enable constructing a three-dimensional model.

28. The system of claim 15, wherein the at least one function comprises at least one of:
a camera application of the user device, or
at least one social media application.

* * * * *